US010521695B2

(12) United States Patent
Agashe et al.

(10) Patent No.: US 10,521,695 B2
(45) Date of Patent: Dec. 31, 2019

(54) METHOD OF ENABLING SPATIALLY VARYING AUTO FOCUSING OF OBJECTS AND AN IMAGE CAPTURING SYSTEM THEREOF

(71) Applicant: Samsung Electronics Co., Ltd., Suwon-si, Gyeonggi-do (KR)

(72) Inventors: Shashank Shrikant Agashe, Bangalore (IN); Gaurav Kumar, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 727 days.

(21) Appl. No.: 15/078,314

(22) Filed: Mar. 23, 2016

(65) Prior Publication Data

US 2017/0061603 A1     Mar. 2, 2017

(30) Foreign Application Priority Data

Mar. 25, 2015   (IN) ............................ 1542/CHE/2015
Aug. 31, 2015   (IN) ............................ 1542/CHE/2015

(51) Int. Cl.
| | | |
|---|---|---|
| G06K 9/62 | (2006.01) | |
| H04N 5/232 | (2006.01) | |
| G06K 9/52 | (2006.01) | |
| H04N 5/265 | (2006.01) | |
| H04N 5/369 | (2011.01) | |
| G02B 26/08 | (2006.01) | |
| H04N 17/00 | (2006.01) | |

(52) U.S. Cl.
CPC ....... G06K 9/6218 (2013.01); G02B 26/0816 (2013.01); H04N 5/23212 (2013.01); H04N 5/265 (2013.01); H04N 5/3696 (2013.01); H04N 17/002 (2013.01); G06K 2209/19 (2013.01)

(58) Field of Classification Search
CPC .......... G02B 26/0816; G06K 2209/19; G06K 9/6218; H04N 17/002; H04N 5/23212; H04N 5/265; H04N 5/3696
USPC ........................................................ 348/87
See application file for complete search history.

(56) References Cited

U.S. PATENT DOCUMENTS

| | | | |
|---|---|---|---|
| 6,246,446 B1 * | 6/2001 | Heimbuch ............... | G02B 7/36 348/744 |
| 6,399,935 B1 * | 6/2002 | Jovin ................. | G02B 21/0032 250/216 |
| 6,549,730 B1 * | 4/2003 | Hamada ................. | G02B 7/102 359/290 |
| 6,707,534 B2 * | 3/2004 | Bjorklund ........... | G03F 7/70291 355/47 |
| 6,771,417 B1 * | 8/2004 | Wolleschensky .... | G02B 21/241 359/368 |
| 7,525,659 B2 * | 4/2009 | Furman .............. | G01N 21/8806 356/400 |

(Continued)

*Primary Examiner* — Mohammed Jebari
(74) *Attorney, Agent, or Firm* — Harness, Dickey & Pierce, P.L.C.

(57) ABSTRACT

The present inventive concepts discloses methods, apparatuses, and/or systems for enabling spatially varying auto focusing of one or more objects using an image capturing system. The methods, apparatuses, and/or systems may include focusing objects in a region of interest using lenses, enabling spatially varying auto focusing of objects in the region of interest using a spatial light modulators (SLM), which are out of focus in the region of interest, and capturing the focused and the auto focused objects in the region of interest using a camera sensor.

14 Claims, 22 Drawing Sheets

(56) References Cited

U.S. PATENT DOCUMENTS

| | | | |
|---|---|---|---|
| 7,551,154 B2* | 6/2009 | Kettle | H04N 9/312 345/84 |
| 7,633,041 B2 | 12/2009 | Furman et al. | |
| 8,134,771 B2* | 3/2012 | Handschy | G03H 1/02 356/450 |
| 8,411,194 B2* | 4/2013 | Davis | H04N 5/2254 348/333.1 |
| 8,740,074 B2* | 6/2014 | Yamazaki | G02B 5/005 235/435 |
| 2003/0053676 A1* | 3/2003 | Shimoda | G01N 21/95684 382/145 |
| 2009/0325088 A1* | 12/2009 | Sjostrom | G03F 7/70466 430/30 |
| 2010/0053745 A1* | 3/2010 | Sander | G02B 21/22 359/389 |
| 2010/0208229 A1* | 8/2010 | Shin | G03F 7/70275 355/77 |
| 2012/0026478 A1* | 2/2012 | Chen | G03F 7/70275 355/53 |
| 2012/0123581 A1* | 5/2012 | Smilde | G03F 7/70483 356/445 |
| 2013/0335535 A1* | 12/2013 | Kane | G01B 11/2513 348/50 |
| 2014/0192336 A1* | 7/2014 | Chen | G03F 7/70275 355/53 |
| 2014/0300890 A1* | 10/2014 | Lange | G01N 21/9501 356/51 |
| 2016/0066780 A1* | 3/2016 | Pamplona | A61B 3/09 351/206 |
| 2016/0305914 A1* | 10/2016 | Wang | G02B 21/0004 |
| 2016/0363538 A1* | 12/2016 | Dutertre | G01J 3/44 |

\* cited by examiner

403a — Section of SLM that overlaps with region of $Z_0$ height. There is no phase variation since lens is in focus at $Z_0$.

403b — Section of SLM that overlaps with $Z_2$ height. This section is a truncated lens with area corresponding to $Z_2$ region.

403c — Phase map of the whole SLM

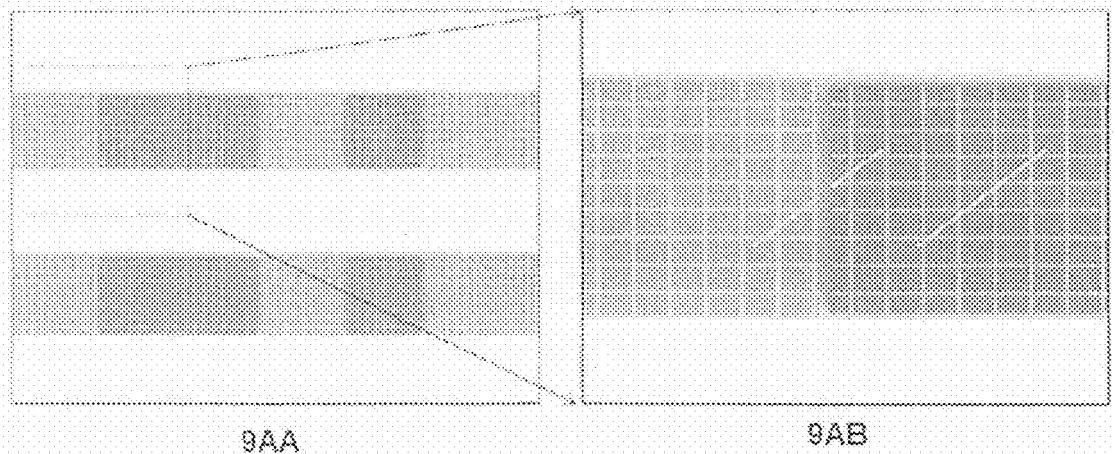

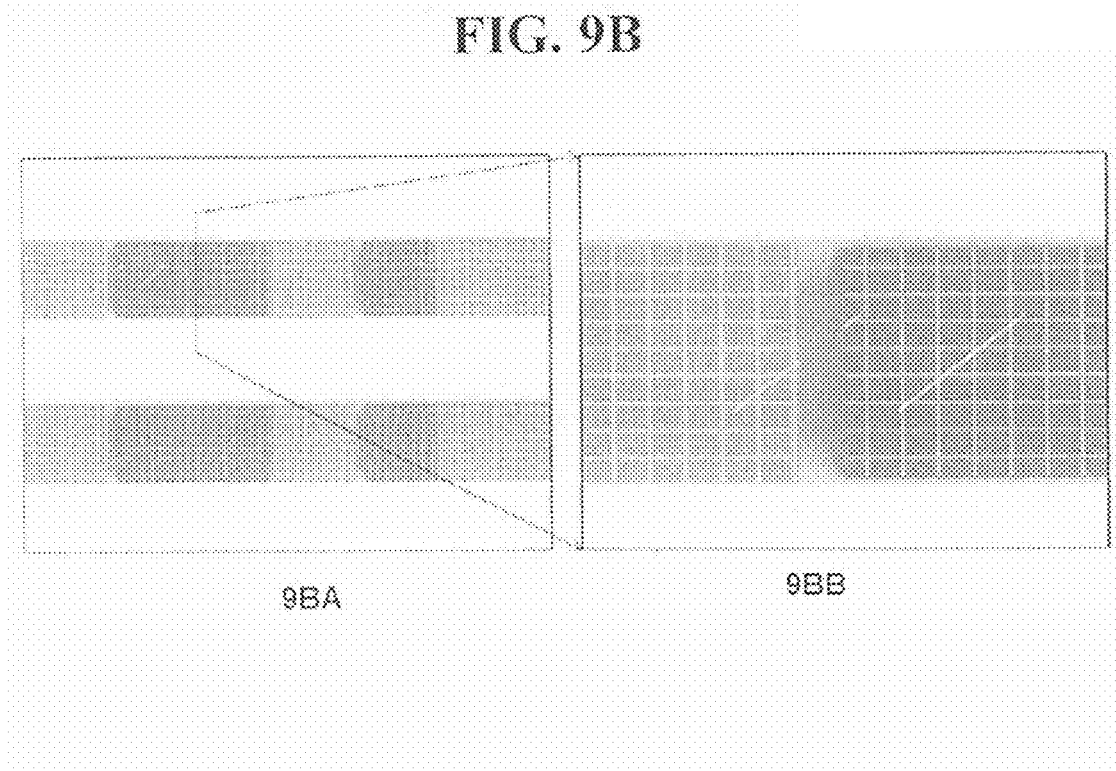

METHOD OF ENABLING SPATIALLY VARYING AUTO FOCUSING OF OBJECTS AND AN IMAGE CAPTURING SYSTEM THEREOF

CROSS-REFERENCE TO RELATED APPLICATIONS

This application claims priority from Indian Patent Application No. 1542/CHE/2015 entitled "A method of spatial focus control using electro-optics for camera lens systems" filed on Mar. 25, 2015 in the Office of the Controller General of Patents, Designs & Trade Marks (CGPDTM), and Indian Patent Application No. 1542/CHE/2015 entitled "Method of enabling spatially varying auto focusing of objects and an image capturing system thereof" filed on Aug. 31, 2015 in the CGPDTM, the disclosures of both of which are hereby incorporated by reference herein in their entireties.

BACKGROUND

1. Field

The present inventive concepts relate to the field of image capturing, and more particularly relate to methods, image capturing systems, image capturing apparatuses, and computer readable media for enabling spatially varying auto focusing of one or more objects.

2. Description of the Related Art

Common drawbacks of fixed lens camera systems are image blurring and aberrations. Even for cameras with variable focus, the final step of focus adjustment typically involves mechanical motion involving either the lens or the camera sensor of the camera system. This mechanical motion causes delay and latency issues when imaging a fast changing scene. Moreover, a single focus setting applied to an entire scene causes defocusing of objects that are at different distances from the camera. When such camera systems are used in line scan cameras for semiconductor wafer inspection, which require fast image scanning and high image magnification, it results in poor image quality which could be detrimental for defect identification in the inspected semiconductor wafers and hence the detrimentally effect the quality and yield of the semiconductor waters.

Some potential solutions for avoiding image blurring and aberrations include the use of light field or plenoptic cameras. Such cameras can record the light field information in a single shot. The recorded light field information is rendered based on the required focus and viewing direction. However, these techniques require large amounts of post-processing and large working distances of approximately ~37 cm. For applications such as semiconductor wafer inspection, the objective lens has high magnification and needs a working distance of typically less than ~5 cm. Additionally, the post processing hardware requirements cannot be met in other contexts, such as on portable devices (e.g., smart phones, tablets, or hand held cameras, etc.) where the user wants to get a quick feedback of how the images or the videos look after being captured. Such limitations make use of plenoptic cameras incompatible with wafer inspection systems, portable devices, etc. Likewise, other potential solutions suffer from the non-reconfigurability of the lens elements or are incapable of providing multiple focal lengths for any given setting of the lens elements.

Hence, there exists a need for methods, systems, apparatuses, and computer readable media for enabling spatially varying auto focusing of one or more objects without mechanical motion of camera lenses and camera sensors.

SUMMARY

An aspect of the present inventive concepts provides a method and system for enabling spatially varying auto focusing of one or more objects using an image capturing system.

In accordance with an aspect of the present inventive concepts, a method of enabling spatially varying auto focusing of one or more objects using an image capturing system includes focusing, using one or more lenses of the image capturing system, on one or more objects in a region of interest, enabling spatially varying auto focusing of the one or more objects in the region of interest using one or more spatial light modulators (SLM), wherein at least one of the one or more objects are out of focus when viewing the region of interest, and capturing the focused and the auto focused objects in the region of interest using a camera sensor.

According to at least one example embodiment, at least one SLM of the one or more SLMs includes one or more segments.

According to at least one example embodiment, the method further includes applying a control signal to at least one of the SLM and each segment of the SLM, and modifying refractive indexes of each of the segments of the SLM and phase of light beam incident on each of the segments of the SLM in accordance with the applied control signal.

According to at least one example embodiment, the method further includes modifying a control signal to provide quadratic variation in phase change across the SLM, wherein the phase change corresponds to a change in focal length of the SUM.

According to at least one example embodiment, the enabling spatially varying auto focusing of the one or more objects in the region of interest using the SLMs includes obtaining a Z map of a die of a wafer to be inspected, calibrating focal lengths of the SLM in accordance with a corresponding control signal based on the Z map of the die for enabling auto focusing of the die of a wafer to be inspected on the camera sensor, and dynamically varying in real time the control signal so as to correspond each segment of the SLM with the die below the camera sensor, by providing different focal lengths using values from the calibration and the Z map.

According to at least one example embodiment, the obtaining the Z map of the die of the wafer to be inspected includes analyzing a cross section of the die to be inspected to obtain a Z height of the die, and quantizing the Z height of the die based on a desired acceptance circle of confusion.

According to at least one example embodiment, the calibrating focal lengths of the SLM includes locating the die having the Z height at a desired distance in front of a camera system for calibrating the focal length of the SLM, modifying the control signal corresponding to each segment of the SLM to bring about a corresponding phase change in each of the segments of the SLM to capture an image with a desired clarity on the camera sensor, and storing the modified control signal and the corresponding phase change of each of the segments of the SLM corresponding to the Z map of the die in a memory of the image capturing system.

According to at least one example embodiment, the enabling spatially varying auto focusing of one or more objects in the region of interest includes removing an aberration from the captured image using at least two SLMs, the removing including, positioning a first SLM of the at least two SLMs and a second SLM of the at least two SLMs between the lens and the camera sensor, changing the focal length of the second SLM by providing a control signal to the second SLM to enable auto focus, modifying a phase profile of the first SLM based on feedback received from the camera sensor to further improve the image corresponding to encoding of an image with Zernike polynomials with increasing orders, and storing the modified phase profile of the first SLM in a memory of the image capturing device.

According to at least one example embodiment, the removing includes determining whether the region of interest has been selected, dividing a field of view of the image capturing system into one or more desired regions of interest, if the region of interest has not been selected, applying an aberration correction to the first SLM that corresponds to the regions of interest, capturing an image of each of the regions of interest, and forming a composite image by combining the captured images of each of the region of images.

According to at least one example embodiment, the enabling spatially varying auto focusing of the one or more objects in the region of interest using the one or more SLMs includes enabling auto focusing for one or more foveation, the method further including selecting the one or more foveation spots by communicating at least one of a shift in gaze information and change in pointing device information to the image capturing system upon identifying the object in focus, and applying the control signal to the one or more segments of the SLM for auto focusing the selected foveation spot.

In accordance with another aspect of the present inventive concepts, an image capturing system includes one or more lenses for focusing one or more objects in a region of interest, one or more spatial light modulators (SLMs) configured to enable auto focusing of the one or more objects in the region of interest, the one or more objects being out of focus in the region of interest when viewed by at least one of the one or more lenses, and a camera sensor configured to capture an image of the focused and the auto focused one or more objects in the region of interest.

According to at least one example embodiment, the SLM includes an array including a plurality of individually addressable segments, each of the segments configured to change properties of an incident light, where the segments are made of at least one of movable elements and stationary elements.

According to at least one example embodiment, a focal length of each of the addressable segments of the SLM is modified by applying a dynamically varying control signal to each of the segments of the SLM.

According to at least one example embodiment, the system further includes a phase detection assembly configured to increase overlap of one or more partial images generated by the lens and aperture mask of the image processing system.

In accordance with another aspect of the present inventive concepts, an image capturing method includes modulating, using a plurality of spatial light modulators (SLMs), light reflected from at least one object located on a semiconductor wafer in accordance with a real-time modulation command, each of the SLMs including a plurality of individually addressable segments, capturing, using an image sensor, an image output by the SLMs, and transmitting, using at least one processor, the real-time modulation command to the plurality of SLMs based on the captured image. According to at least one example embodiment, the method further includes filtering, using an aperture mask, the reflected light prior to receipt by the SLMs, generating, using the image sensor, one or more partial images from the filtered light, processing, using the processor, the generated partial images, and providing, using the processor, feedback to the SLMs to modify the focus length of the SLMs in accordance with the generated partial images.

According to at least one example embodiment, the real-time modulation command includes instructions to configure the SLMs to adjust the phase of the reflected light passing through the SLMs.

According to at least one example embodiment, the at least one object located on the semiconductor wafer is a calibration die including a plurality of physical features of different heights.

According to at least one example embodiment, the transmitting includes storing information regarding the different heights of the physical features in a memory associated with the image sensor, clustering the different heights in accordance with a calculated depth of field for the image capturing system, and generating, using the processor, the real-time modulation command based on the clustered heights.

According to at least one example embodiment, the method further includes modifying, using the processor, the real-time modulation command based on the height of each segment of the object being viewed by the image sensor.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 9A depicts a die image captured using the image capturing system, where the speed of SLM is matched with the camera sensor, according to at least one example embodiment of the present inventive concepts.

FIG. 9B depicts a die image captured using the image capturing system, where the speed of SLM is 1/10th of the camera sensor, according to at least one example embodiment of the present inventive concepts.

DETAILED DESCRIPTION

Figure 1:
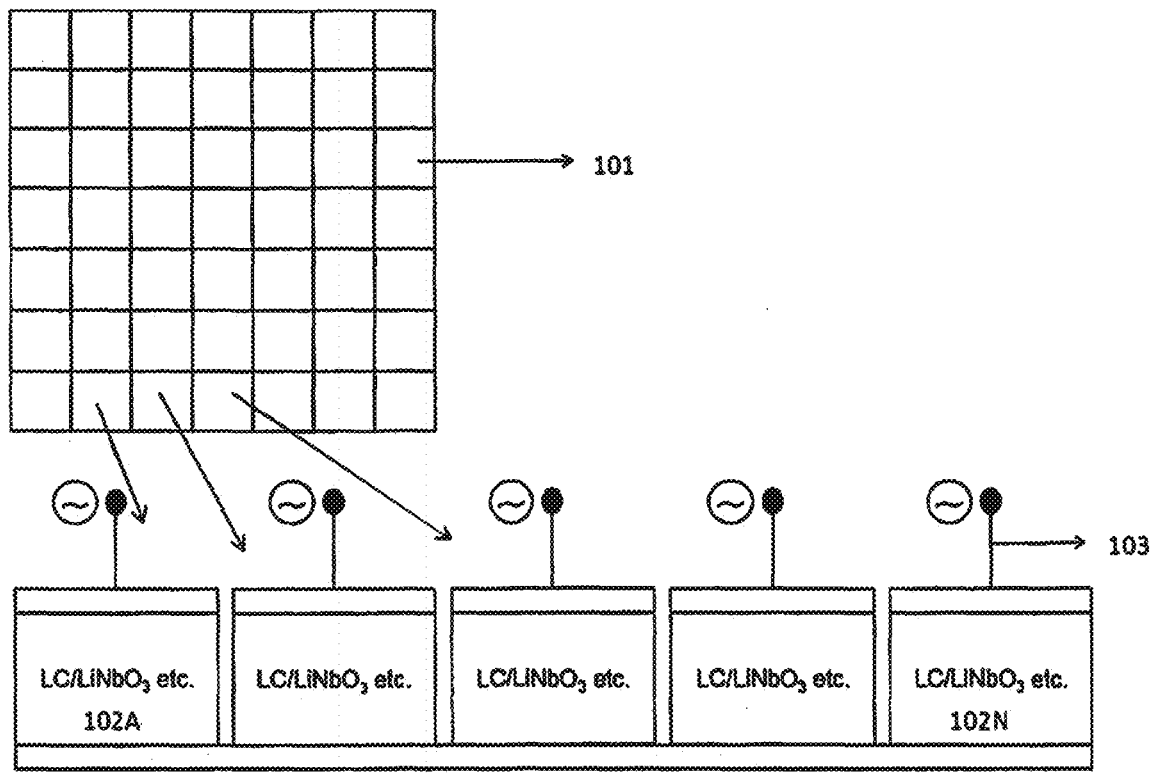
FIG. 1 illustrates a schematic representation of a two-dimensional spatial light modulator (SUM) made of material such as liquid crystals (LC) and Lithium Niobate (LiNbO3) and one or more segments of the SLM according to the prior art.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers mod/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements mod/or components, hut do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

In example embodiments, a nonvolatile memory may be embodied to include a three dimensional (3D) memory array. The 3D memory array may be monolithically formed on a substrate semiconductor substrate such as silicon, or semiconductor-on-insulator substrate). The 3D memory array may include two or more physical levels of memory cells having an active area disposed above the substrate and circuitry associated with the operation of those memory cells, whether such associated circuitry is above or within such substrate. The layers of each level of the array may be directly deposited on the layers of each underlying level of the array.

In example embodiments, the 3D memory array may include vertical NAND strings that are vertically oriented such that at least one memory cell is located over another memory cell. The at least one memory cell may comprise a charge trap layer.

The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and U.S. Pat. Pub. No. 2011/0233648.

The present inventive concepts focus on spatial light modulator (SLM) based solutions to all-in-focus image capture. The methods disclosed in connection with various present inventive concepts may be implemented in semiconductor wafer inspection with camera systems, such as line scan cameras, area scan cameras, etc., during semiconductor device manufacturing. The cutting edge of semiconductor manufacturing is already at node sizes of 14 nm, and in those circumstances, defects that span just one pixel at the highest magnification of optical systems can be detrimental to the device's performance. Therefore, obtaining focused images becomes an important aspect of improving semiconductor device/wafer defect detection and hence greatly improve the quality and yield of the semiconductor wafers. Likewise, the present inventive concepts also enable fast and motionless auto focus mechanisms, which can be integrated into any adjustable focus camera as well as methods to obtain shift variant aberration correction and foveation for live video feeds. At least one example embodiment of the present inventive concepts implements the phase modulation of transmissive spatial light modulator (SLM) to create segmented lenses in desired (or alternatively; pre-determined) regions within the SLM to obtain all-in-focus high resolution images. Moreover, various example embodiments of the present inventive concepts provide correction of shift variant aberration and real time foveation in live video feed.

FIG. 1 illustrates a schematic representation of a two-dimensional (2D) spatial light modulator (SLM) according to the prior art. The SLM is currently being used in various forms in LCD display panels and projectors. The SLM 101 as shown in FIG. 1 consists of a 2D array of individually addressable segments (e.g., 102A to 102N). Each array segment of the SLM 101 has a unique capability of modulating the amplitude, phase, or polarization of incident light based on a control signal applied on each of the segments. The control signals may be an applied voltage, current, or optical pulse. The control signals are applied using electrodes. The electrodes are made of transparent conductive materials, such as Indium Tin Oxide, in the case of transmissive SLM. The electrodes are indicated by reference numerals 103A to 103N. SLMs used for image capturing purpose are based on materials, such as liquid crystals (LCs) or Lithium Niobate (LiNbO3). Alternatively, the SLM may consist of elements made of micro-mirrors. SLMs have three main types of modulation format, i.e., amplitude, phase, and polarization. For each of these modulation formats, there are at least two types of SLMs available, such as reflective and transmissive.

At least one example embodiment of the present inventive concepts incorporates the Spatial Light Modulator (SLM) 101 into the image capturing system. At least one example embodiment of the present inventive concepts uses the phase modulation property of transmissive SLMs to enable all-in focus and auto focus high resolution image generation according to various present inventive concepts. At least one example embodiment of the present inventive concepts locates the SLM in a unique configuration to transform the SLM into a multi-lens structure with electrically/optically tunable focal lengths.

SLM arrays with one (1) Million Pixel resolution are available. As the SLM is electrically/optically controlled, the phase of the SLM may potentially be changed at various desired frequencies, such as a rate of 1.4 kHz. The rate of phase change of the SLM is high compared to the capturing speed of most general purpose cameras. However, the capturing speed is not sufficient for high accuracy image capturing devices, such as line scan cameras, which can capture images at even higher speed. Hence, at least one example embodiment of the present inventive concepts provides a method of all-in-focus image capture during semiconductor wafer inspection with line scan cameras. Additionally, at least one example embodiment of the present inventive concepts provides fast and motionless auto focus mechanism, correction of shift variant aberration, and real time foveation in a live video feed using SLM.

The refractive index of birefringent elements of SLM may be modified by application of an electric/optic control signal (e.g., a modulation command). For instance, consider that the control signal is an applied voltage. Then the relation between the phase-change and the refractive index is given by: (Equation 1)

$$\phi = \frac{2^*\pi^*H}{\lambda}\Delta n(E)$$

where H is the thickness of the SLM element, λ is the wavelength of light, and n is the refractive index change based on the applied electric field E. In the case of quasi-monochromatic beam of light, λ is substituted by the average wavelength denoted by $\lambda_{avg}$.

Figure 2A:
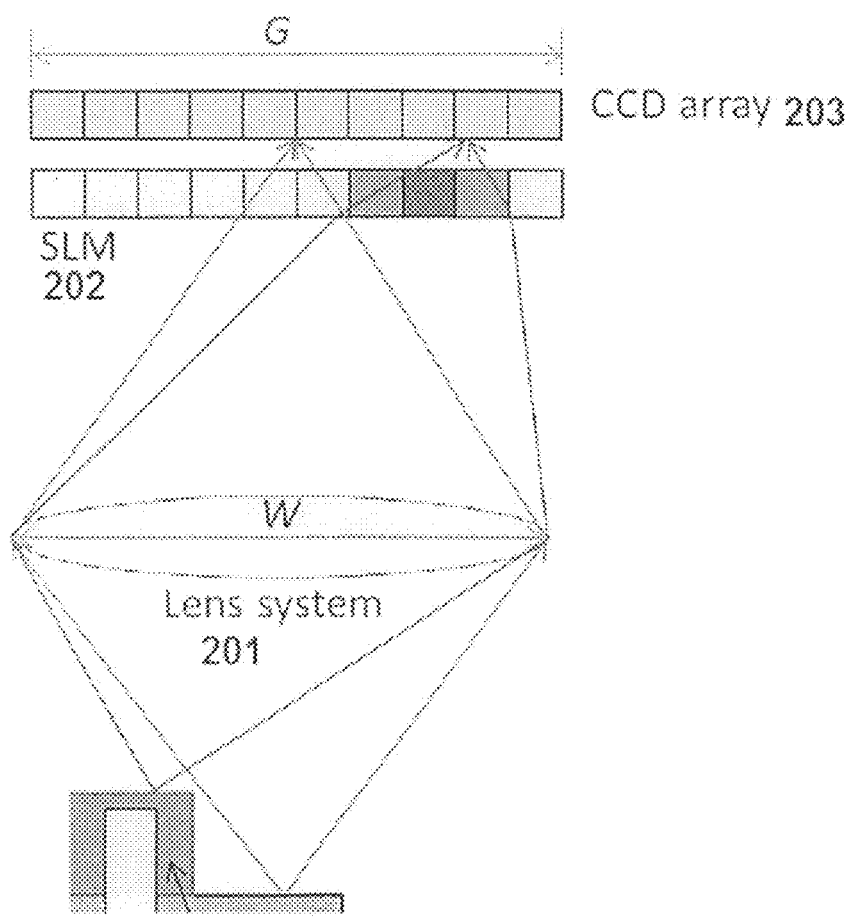
FIG. 2A illustrates a schematic representation of an image capturing system, according to at least one example embodiment of the present inventive concepts.

FIG. 2A illustrates a schematic representation of an image capturing system, according to at least one example embodiment of the present inventive concepts. The image capturing system according to at least one example embodiment of the present inventive concepts includes one or more lenses 201, one or more spatial light modulator (SLM) 202 and one or more camera sensors 203. The one or more lenses 201 are used to focus light of one or more objects in a region of interest. The spatial light modulator (SLM) 202 enables auto focusing of one or more objects in the region of interest, which are out of focus in the region of interest by the one or more lenses. The principles of using the SLM and the construction of the SLM are explained in detail in connection with FIG. 1. The at least one camera sensor 203 captures an image of the focused and the auto focused one or more objects in the region of interest. The camera sensors implemented in the image capturing system according to at least one example embodiment of the present inventive concepts are charge coupled device (CCD) arrays, but are not limited thereto and may be CMOS sensors, etc. The region of interest is the field of view of the image capturing system at the time of capture.

In at least one example embodiment, the SLM 202 comprises a plurality of array of individually addressable segments which may change the properties of incident light (i.e., light approaching the individual segments of the SLM 202). The addressable segments are made of at least one of movable elements and stationary elements. The focal length of each of the addressable segments of the SLM is improved, enhanced, and/or optimized by applying a dynamically varying control signal to each segment of the SLM.

In at least one example embodiment, the image capturing system further comprises a phase detection assembly for increasing and/or maximizing the overlap of one or more partial images generated by the lens and aperture mask of the image processing system for enabling auto focusing. The phase detection assembly comprises a focus change feedback module and an image processing module. The focus change feedback module is configured to provide feedback from the camera sensor to increase, enhance, and/or optimize the focus of the region of interest in order to encode the SLM with the phase settings of the SLM elements, which convert the SLMs into lenses that have the focal length necessary to focus on the region of interest. The image processing module is connected to the camera sensor and the focus change feedback module for processing a captured image.

Figure 2B:
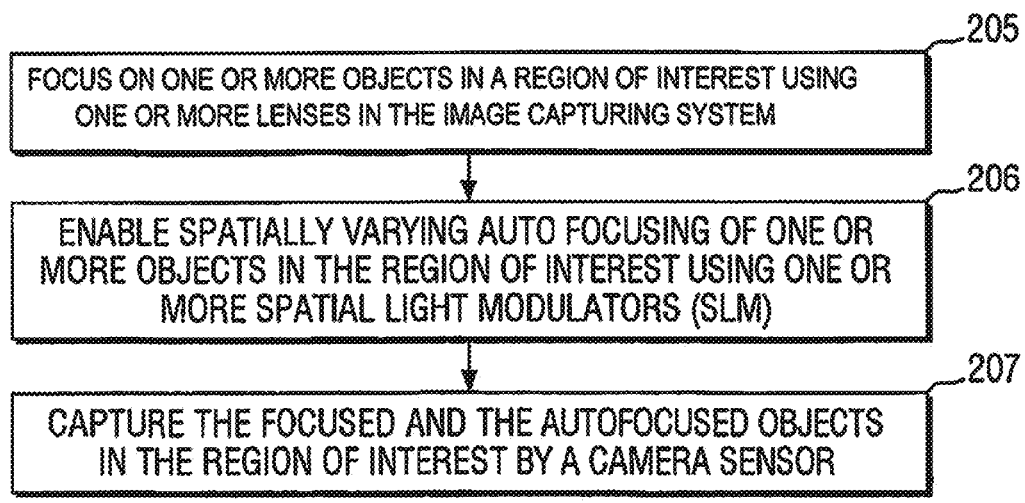
FIG. 2B is a flow diagram illustrating a method of enabling spatially auto focusing of one or more objects using an image capturing system, according to at least one example embodiment of the present inventive concepts.

FIG. 2B is a flow diagram illustrating a method of enabling spatially varying auto focusing of one or more objects using an image capturing system, according to at least one example embodiment of the present inventive concepts. The method of enabling spatially varying auto focusing of one or more objects using an image capturing system provides an all-in focus, auto focused high resolution image. In order to enable the spatially varying auto focusing of one or more objects using an image capturing system, at step 205, the one or more objects in a region of interest are focused by one or more lenses in the image capturing system. However, there are multiple objects which are not in a preferred focal length from the lens. Those images are inevitably blurry since the lens cannot focus simultaneously. This reduces the image quality of the images. Hence, at step 206, the spatial light modulators (SLM) enable spatially varying auto focusing of one or more objects in the region of interest which are out of focus in the region of interest by the one or more lenses. This enables an all-in focus effect. The SLMs enable an all-in focusing effect by changing the focal length of each segment of the SLM. The focal length of each segment of the SLM is changed by applying a control signal at each of the segments of the SLM. Additionally, a control signal may be applied to a plurality of the segments of the SLM in order to control the segments of the plurality of the segments simultaneously. Further, at step 207, the focused and the auto focused objects in the region of interest are captured as an image by a camera sensor.

Figure 3:
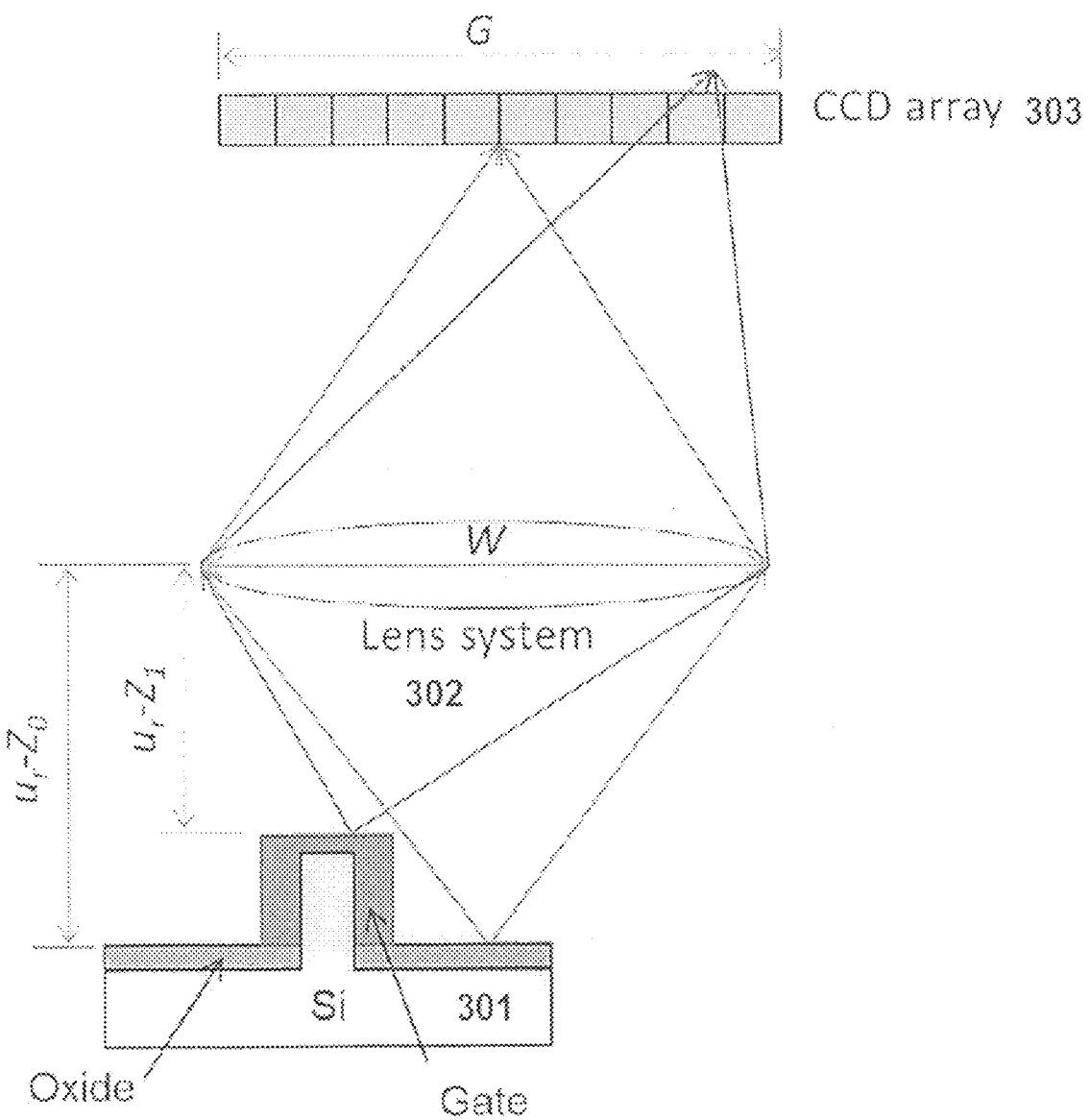
FIG. 3 illustrates a system for semiconductor wafer inspection process using line scan camera according to the prior art.

FIG. 3 illustrates a system for semiconductor wafer inspection process using line scan camera according to the prior art. The line scan camera is typically used for semi-conductor wafer inspection due to its superior sensitivity during high speed acquisition. The major elements of the line scan camera consists of a lens system 302 and camera sensors 303, such as a CCD array. A view under the line scan camera lens consists of a number of physical features of the object being observed, such as mesas, trenches, gratings, etc., that are located at different heights Z with respect to some reference layer in the semiconductor wafer die 301. FIG. 3 represents such a scenario where a mesa is under the lens. The distance between the lens and the CCD is such that the field feature of the die 301 is in focus. In FIG. 3, the top of the mesa of the die 301, at a distance $u_1$-$Z_1$ from the lens, is out of focus when observed by the CCD array 303, while the field layer at distance $u_r$-$Z_1$ is in focus. Since a lens can have only one object plane in complete focus at any given time, the top of the mesa is out of focus and therefore appears blurry. This situation is depicted by rays from the field converging at the surface of the CCD array 303 and those from the mesa converging behind the CCD array 303. The images generated using such systems are inevitably blurry because the lens cannot focus at all of the Z heights relevant to the object being observed (e.g., the die 301) simultaneously. This reduces the quality of the images and thereby degrades the accuracy of the semiconductor device defect inspection process that uses these images. In at least one example embodiment, the magnification of the system as shown in FIG. 3 is shown to be around 1×, but in reality it can be around 30× to 100× magnification.

Figure 4A:
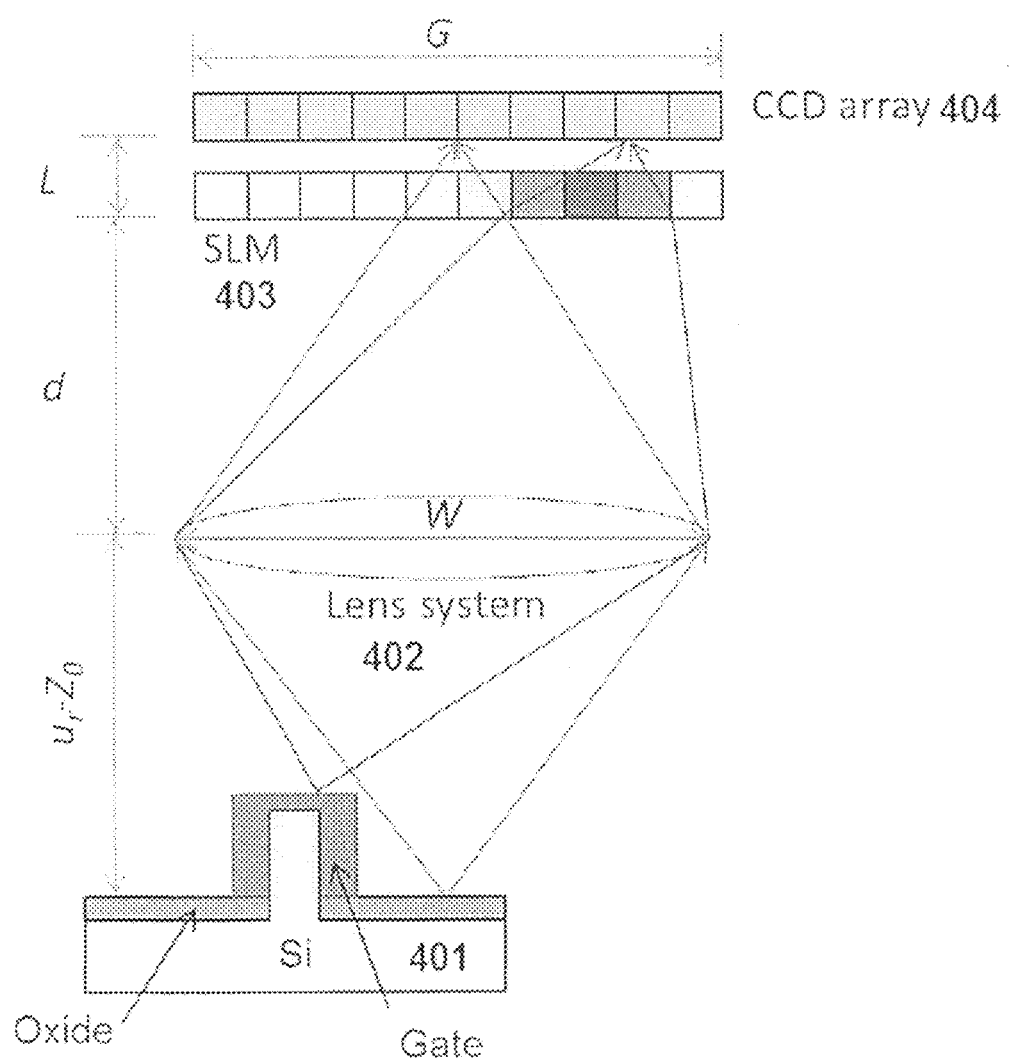
FIG. 4A illustrates a system for semiconductor wafer inspection process using line scan camera employing SLM, according to at least one example embodiment of the present inventive concepts.

FIG. 4A illustrates a system for wafer inspection process using a line scan camera employing SLM, according to at least one example embodiment of the present inventive concepts.

The line scan camera according to at least one example embodiment of the present inventive concepts comprises a lens system 402, camera sensors 404, and SLM 403. In at least one example embodiment of the present inventive concepts, the SLM 403 is located close to the camera sensor 404 at a distance of a few hundred microns. The camera sensor 404 implemented in at least one example embodiment of the present inventive concepts is a CCD array. The exact separation is obtained implicitly during the calibration procedure of the SLM 403, which is discussed in connection to FIG. 5A and FIG. 5B. The line scan camera further comprises a light polarizer (not shown) that filters out any light that is not linearly polarized along the extraordinary axis of the SLM. The light polarizer may be independently placed before the first element of camera lens and is an optional component of the line scan camera. For instance, consider that a section of the wafer 401 with mesa and field features on the wafer is under the lens. The SLM 403 is calibrated to focus on each portion of the wafer 401. This enables both the mesa and flat portions of the wafer to be in focus. The rays from the mesa, as well as the flat surface of the water, are converging at the surface of CCD arrays. While a line scan camera is discussed in connection with the example embodiments, the example embodiments are not limited thereto and the example embodiments may employ any other suitable camera technology.

The FIG. 4A illustrates the following distances and dimensions:

L=distance between the CCD and the SLM,
D=distance between the SLM and the final element of the lens system,
$u_r$-$Z_0$=distance of the flat area of the die 401 from the first element of the lens system,
W=diameter of the camera lens, and
G=length of the CCD and the SLM.

In order to provide higher accuracy images in order to improve the defect inspection process of semiconductor wafer processing, the Z map of the die to be scanned is obtained (e.g., a topological map of the die). Further, the SLM which is implemented in the line scan camera is calibrated corresponding to the Z map of the die. During scanning of the die, the control signal to each segments of the SLM varies according to the portion of die under the view of lens of the line scan camera.

Figure 4B:
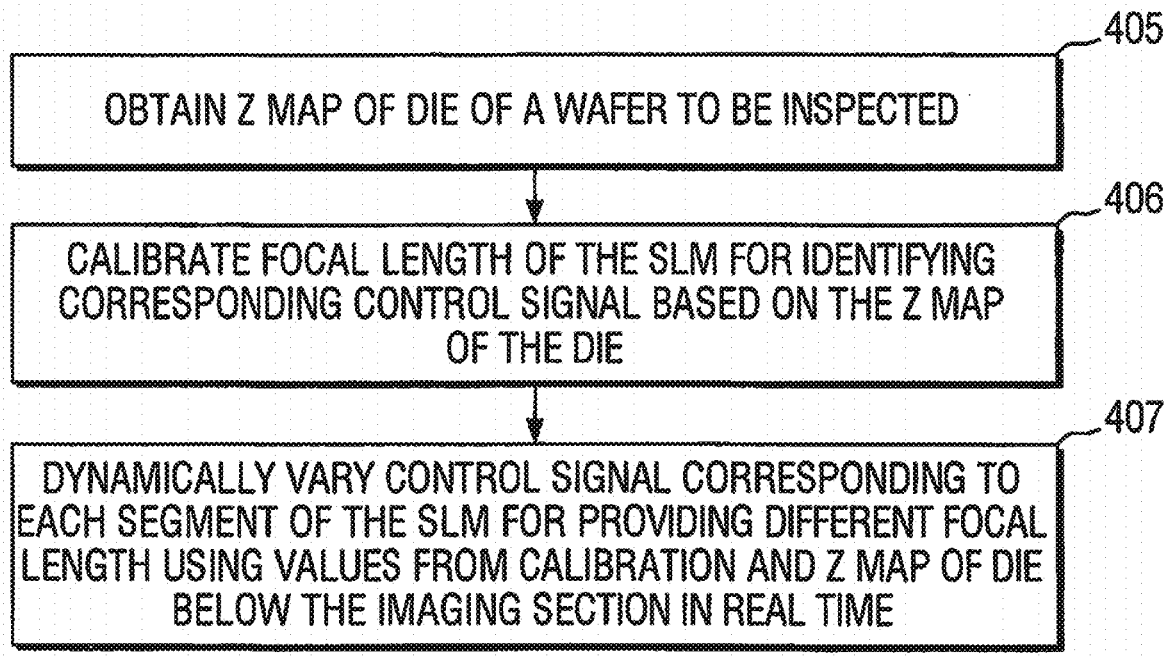
FIG. 4B illustrates a method for semiconductor wafer inspection process using line scan camera employing SLM, according to at least one example embodiment of the present inventive concepts.

FIG. 4B illustrates a method for a semiconductor wafer inspection process using a line scan camera employing SLM, according to at least one example embodiment of the present inventive concepts. In order to initiate the wafer inspection process, at step 405, the Z map of a die of a wafer to be inspected is Obtained. The method of Obtaining the Z map is explained in detail in connection to FIGS. 5A and 5B. Once the Z map is obtained, the SLM is calibrated using the control signal. The control signal may be electrical or optical signal as indicated in step 406. The refractive index of the SLM is changed based on the control signal. This results in a focal length change. Hence, different control signals are applied to each segments of the SLM as explained in FIG. 1. Therefore, each segment of the SLM may possess different focal lengths, which enables diverging rays from the die toward the CCD array using the SLM. The calibration procedure of the SLM is described in detail in FIG. 6A and FIG. 6B. Further, at step 407, the control signal is varied dynamically corresponding to each segment of the SLM in order to provide different focal lengths using values from the calibration and the Z map of the die below the image capturing system in real time. This enables an all-in focus effect on the die in real time. Hence, the accuracy of the scan increases and the defect detection process is improved.

Figure 5A:
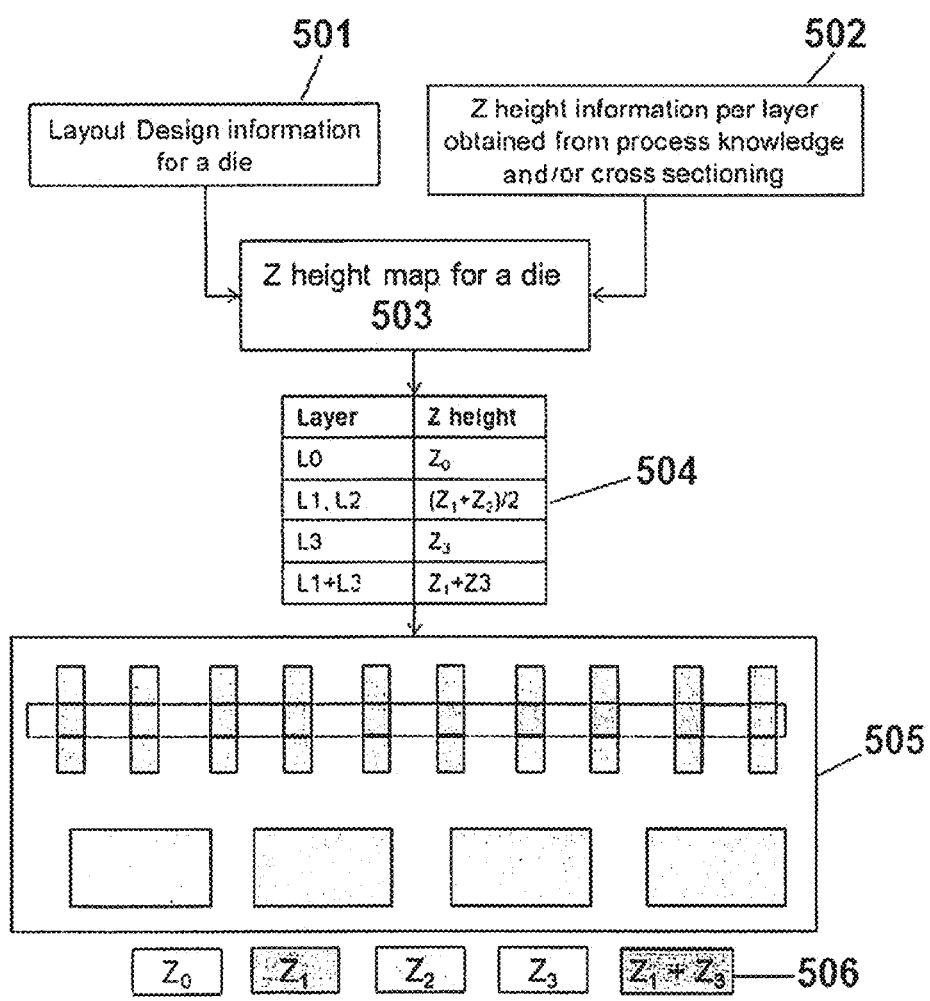
FIG. 5A is a schematic representation of process for generating Z map of a die, according to at least one example embodiment of the present inventive concepts.

FIG. 5A is a schematic representation of a process for obtaining the Z map of a die, according to at least one example embodiment of the present inventive concepts. In order to calibrate the SLM to dynamically change the focal lengths, the height of any (X, Y) location on the die with respect to a reference layer needs to be calculated. This is referred as the Z map of the die. To obtain the Z map, the thickness of all of the layers that overlap at any (X, Y) location at a given inspection step in the process flow is computed. The layout information of the layers is obtained from the design layout as shown at 501. Likewise, the information of the thickness is obtained by process knowledge. Moreover, cross-sectioning of the die at selected locations also provides information regarding the thickness of the die as indicated at 502. The cross-section thickness information may supplement or be used instead of the thickness information derived from the process knowledge. The Z map is obtained from 501 and 502. Further, each layer and corresponding Z heights are tabulated as shown in 503. Then, for example, if the die is composed of four main layers depicted in FIG. 5A with respective Z heights Z0, Z1, Z2 and Z3, while a fifth layer is formed by the overlap of second and fourth layer with a height of Z1+Z3 as indicated at 506 is identified.

Upon obtaining this information, the Z map is quantized by ΔZc which corresponds to the Z difference that results in an acceptable circle of confusion. For any lens system, a circle of confusion is formed for objects that are not at the perfect distance as determined by the lens formula. The range of distance around an object that results in an acceptable circle of confusion is called the depth of field (ΔZc) and is given as follows: (Equation 2)

$$\Delta Z_c \cong \frac{c*(d+L)}{W*M^2}$$

where c is the diameter of the circle of confusion;
W is the lens diameter;
M is the lens magnification;
L=distance between the CCD and the SLM; and
D=distance between the SLM and the final element of the lens system.

Further, the different layers of the die are clustered and/or grouped based on the Z heights. Hence, all of the layers are assigned to a cluster, where each of the clusters are separated by less than ΔZc. ΔZc is the depth of the focus as determined by the acceptable circle of confusion. The Z value for a cluster is the average of Z heights of the layers belonging to that cluster. Such clustering mechanism is termed as quantization, which reduces the cost of computation (e.g., processing time) without decreasing the image sharpness.

This relationship is depicted in the following equation where i and j indicate different Z clusters: (Equation 3)

$$\min \text{abs}(Z_i - Z_j)_{\forall i \neq j} > \Delta Z_c$$

For example, the first and second layers may be clustered together (i.e., assigned to the same cluster) with an average height of (Z1+Z2)/2. Typically, the minimum radius of circle of confusion is limited by the resolution of the lens and camera sensor system. Also, it is not necessary to obtain the Z map of the entire die; it may be limited to certain regions of the die, such as to the regions of interest which are deemed critical to the functioning of the die at that inspection step, etc.

Figure 5B:
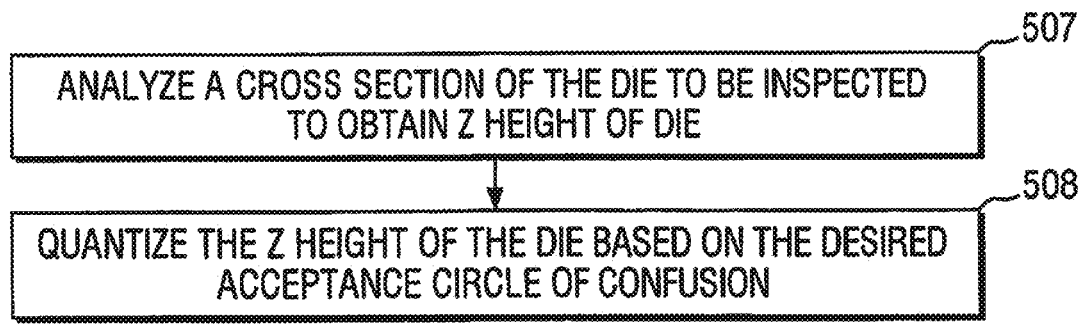
FIG. 5B is flow diagram illustrating the process of generating Z map of a die, according to at least one example embodiment of the present inventive concepts.

FIG. 5B is a flow diagram illustrating the process of generating a Z map of a die, according to at least one example embodiment of the present inventive concepts. In order to calibrate the SLM in accordance with the die, at step 507 the cross section, design layout, and deposition thickness of the die to be inspected are measured and/or analyzed to obtain the Z height map of the die. Once the Z height map is obtained, at step 508 each Z height of the die is quantized by making a set of cluster based on the desired (or alternatively, pre-defined) acceptable circle of confusion. This is termed as layer clustering.

Figure 6A:
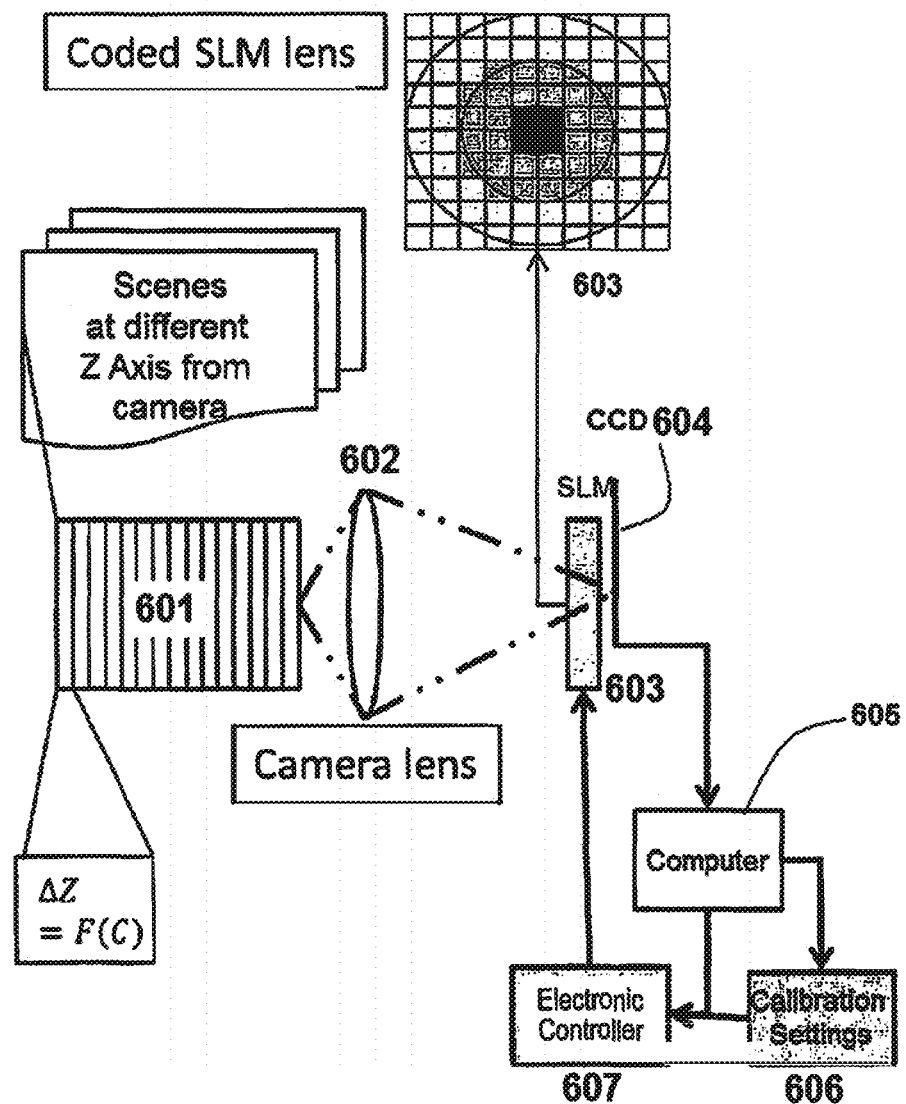
FIG. 6A is an example set up for performing calibration of SLM, according to at least one example embodiment of the present inventive concepts.

FIG. 6A is an example set up for performing calibration of SLM, according to at least one example embodiment of the present inventive concepts. Once the Z map is obtained after layer clustering, the SLM is calibrated. The calibration of SLM is performed by moving a calibration die under the lens. The example set up for calibration as indicated in FIG. 6A includes a die 601, a camera lens 602, the SLM 603 to be calibrated, and the CCD 604. A computer 605 is connected to and/or coupled with the CCD 604, the calibration setting module 606, the electronic controller 607, and the SLM 603. The computer 605 includes at least one processor (not shown) configured to execute computer readable instructions stored in a memory of the computer 605 (not shown). The computer readable instructions include instructions for transforming the processor of the computer 605 into a special purpose processor configured to execute the methods of at least one of the example embodiments described herein.

The die 601 includes layers which are separated by the same Z values as the clusters in the Z map. This die used for calibration may be a calibration die or a die from the wafer which needs to be inspected. Typically, the calibration is to be run only once for a given layout or process, hut is not limited thereto. The calibration is a part of a semiconductor manufacturing process. The camera lens 602 is first focused on the reference layer which is at distance $u_r$ from the lens 602. For example, consider that 0th layer is a reference layer of die, i.e., $Z_0=0$. The next layer, the $Z_1$ layer, when it is brought under the lens, appears blurry. Then the phase-change of the SLM segment is varied through the application of a control signal according to the following formula until an image with maximum sharpness is obtained on the CCD 604: (Equation 4)

$$\phi(x, y, Z_1) = K^*(x^2 + y^2)$$

$$K \sim \frac{\pi}{\lambda_{avg}^* f_{Z_1}}$$

Where $\lambda_{avg}$ is the average wavelength of illumination, which is around 550 nm for full visible spectrum illumination, $f_{z1}$ is focal length of the SLM such that the layer at $Z_1$ is focused on the CCD.

Likewise, x and y correspond to the horizontal and vertical indexes respectively of the SLM from its center. By substituting for equation 3, we get the relation between the refractive index change required for any SLM element as a function of corresponding x and y index as follows: (Equation 5)

$$\Delta n(x, y) = \frac{(x^2 + y^2)}{2^* H^* f_{Z_1}}$$

The refractive index change is independent of the wavelength λ in an ideal case. Moreover, the variation of phase-change with distance from the center depicted in equation 4 is similar to that of a thin lens. Thus, the step up for calibration of the SLM is converted to a compound lens. The focal length of the second lens (i.e., the SLM lens) is related to the object and image distance which is given as follows: (Equation 6)

$$f_{Z_1} = \frac{\frac{v^* f_1^* u}{u - f_1} - v^* d}{\frac{f_1^* u}{u - f_1} - d - v}$$

Where $f_t$ is the focal length of the camera lens;

d is the distance between the camera lens and the SLM;

u is the distance of the object in front of camera which is given by ($u_r$-$Z_1$) for the $Z_1$ layer; and v is the distance of the image behind the SLM which in this case is the same as the distance between the SLM and the CCD (i.e. L).

According to at least one example embodiment of the present inventive concepts, imperfections in the camera lens, such as local variations in the radius of curvature or offset between optical axes of the segments of the SLM, accounts for the approximation sign in front of the constant K in equation 4. Such variations are resolved during the calibration procedure through fine tuning of the increased, enhanced, and/or optimized phase-change values. Expected phase change values typically vary as the square of the distance of the SLM element from the center. An example of the enlarged phase change pattern correspond to the phase change values as shown at reference numeral 603 of FIG. 6A. The phase-change values are stored in memory and are indexed with the corresponding Z value as well as the location of each segments of the SLM element in a corresponding two-dimensional (2D) matrix.

Figure 6B:
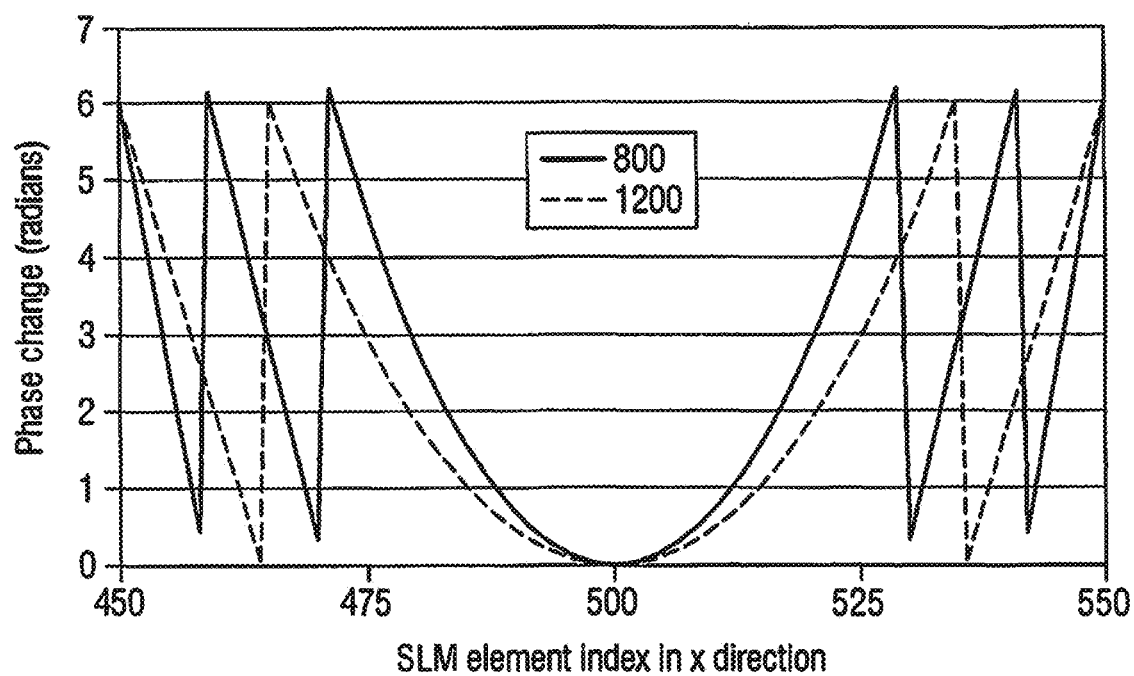
FIG. 6B depicts a graph showing variation of SLM element phase-change in X direction for different values of the focal length of the SLM lens according to at least one example embodiment of the present inventive concepts.

FIG. 6B depicts a graph showing the variation of the SLM element phase-change in the X direction for different values of the focal length of the SLM lens according to at least one example embodiment of the present inventive concepts. In FIG. 6B, the graph shows a one-dimensional view of the calculated phase-change values of the SLM elements for two different focal lengths (i.e., the dashed line represents 800 microns, and the solid line represents 1200 microns). In this case, a one (1) Million Pixel SLM is considered which puts the center of lens at the 500th element of the SLM. The sharp discontinuities are shown in the graph which corresponds to a phase wrapping technique. The discontinuities occur at different elements of the SLM depending on the focal length.

In at least one example embodiment, the phase-change □□□x, y, $Z_1$) is greater than the tuning limit of the SLM. In another example embodiment of the present inventive concepts, the technique of phase wrapping is used whereby the elements of the SLM are coded with [□□□x, y, $Z_1$) mod 2□] to get an equivalent effect. The above procedure is then repeated for all of the layers of interest on the die. The image on the CCD is analyzed by the computer for clarity. The calibration settings module 606 and electronic controller 607 act as a feedback system. Based on the image captured on the CCD, the calibration setting module 606 regulates the control signal provided by the electronic controller 607.

Figure 7A:
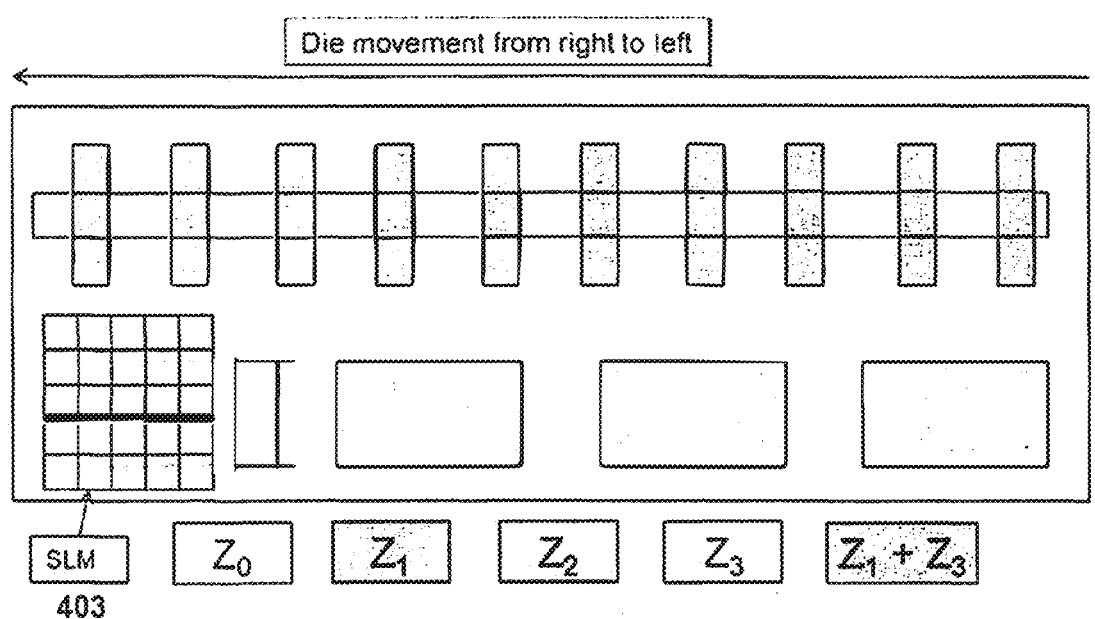
FIG. 7A is a schematic representation of semiconductor wafer inspection process of a die having various layers with different heights, according to at least one example embodiment of the present inventive concepts.

FIG. 7A is a schematic representation of a semiconductor wafer inspection process of a die having various layers with different heights, according to at least one example embodiment of the present inventive concepts. According to the at least one example embodiment illustrated in FIG. 7A, the SLM is dynamically segmented based on the control signal. A control signal provides a phase-change value for each segment of the SLM that focuses the light that corresponds to the Z height of the layer under the view of the lens of the line scan camera. The knowledge of the region underneath the lens is obtained and/or calculated from the information of the starting point of the stage relative to the edge of the first die and the stage speed. The starting point of the stage is determined based on the fact that where the first die is located relative to the point from where the stage starts its motion. The stage speed is the distance the stage moves in unit time.

The phase-change values are stored in the memory during the calibration procedure described in FIG. 6A. In another example embodiment of the present inventive concepts, the SLM is considered as a union of different segments with phase coding such as □□□x, y, $Z_1$ □, □x, y, $Z_2$□□. The wafer (die) moves across the inspection stage, for example from right to left, with the speed of the inspection stage. The CCD 404, SLM 403, and lens elements are held stationary. As the die is moved across the inspection stage, different regions of the die come under the SLM, which requires dynamic change in the phase-change settings of the SLM. From the knowledge of the stage speed and the die layout, these phase-change settings can be recalled from memory and applied appropriately. The focal length of each segment of the SLM changes with the phase change. Hence, each portion of the die having different Z heights focuses on the CCD using the SLAT 403.

Figure 7B:
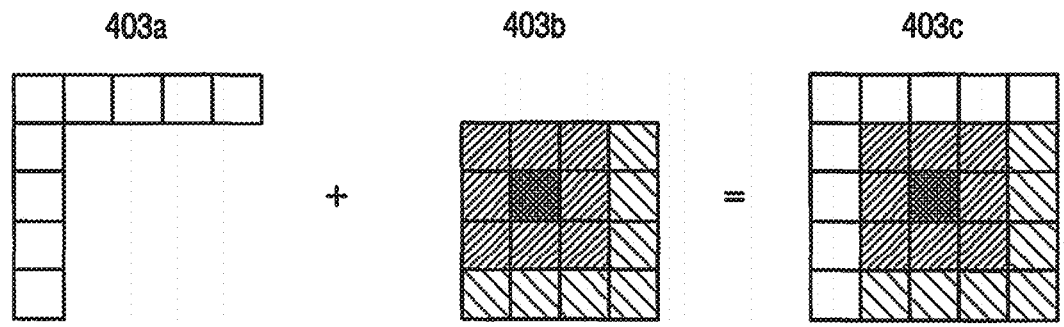
FIG. 7B illustrates different regions of SLM corresponding to the die having various layers with different heights, according to at least one example embodiment of the present inventive concepts.

FIG. 7B illustrates different regions of the SLM corresponding to the die having various layers with different heights, according to at least one example embodiment of the present inventive concepts. In at least one example embodiment of the present inventive concepts, the control signal is dynamically varied in order to provide different focal lengths for each segment of the SLM using values from the calibration and the Z map of the die below the imaging section in real time. Different regions of the SLM corresponding to the different positions of the die are shown in FIG. 7B. For example, the SLM may be segmented into two regions such as the region corresponding to $Z_0$ (e.g., 403a) and another to $Z_2$ (e.g., 403b).

From FIG. 7B, it is clear that the region corresponding to $Z_0$ (i.e., 403a) does not have any phase-change because the lens of the camera is in focus on $Z_0$. However, the region corresponding to $Z_2$ (i.e., 403b) acts as a lens with a focal length of $f\_Z_2$ to bring that region into focus. This region is truncated to limit the applicability to the $Z_2$ section of the die. The whole SLM as shown in (403c) is a combination of the 403a and 403b regions.

Figure 8:
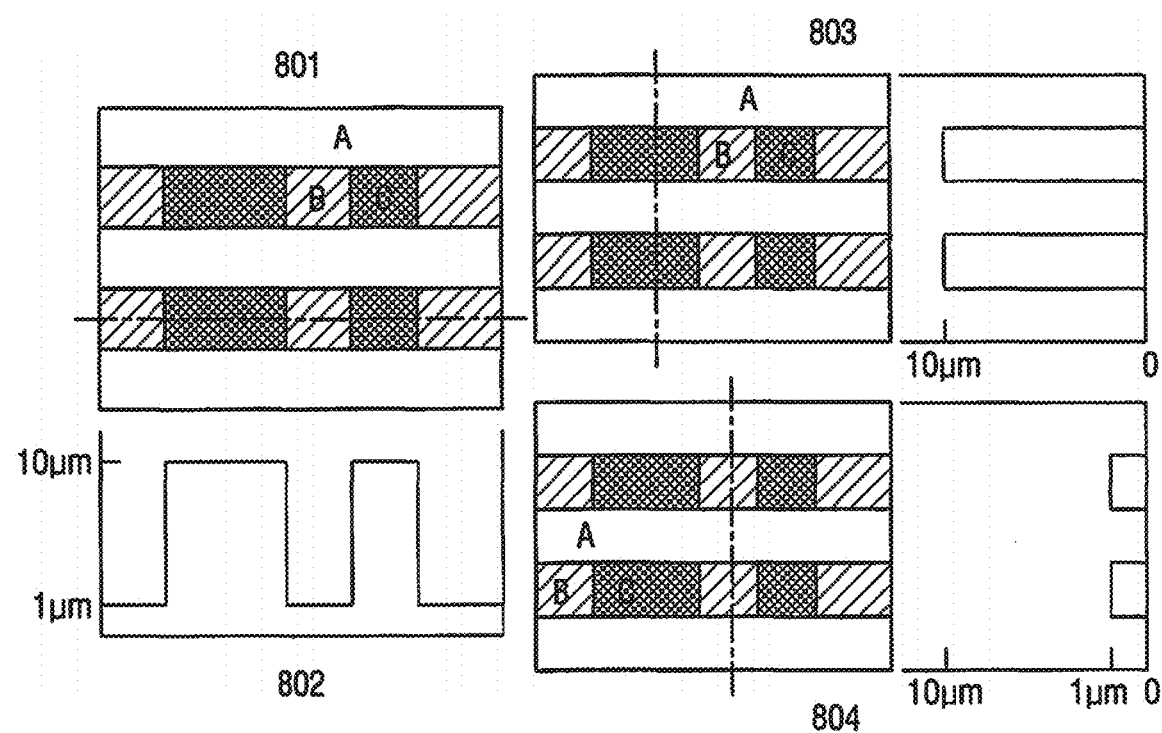
FIG. 8 depicts a die image captured using the image capturing system according to at least one example embodiment of the present inventive concepts.

FIG. 8 depicts a die image captured using the image capturing system according to at least one example embodiment of the present inventive concepts. FIG. 8 also illustrates a cross sectional view of the die. According to the example illustrated in FIG. 8, region A is the bottom layer, region C is 1 μm above region A, and region B is 10 μm above A. Few defects (e.g., the white lines crossing regions B and C) as shown in 801, 803 and 804 of FIG. 8 are the defects in the die inspected by the line scan camera according to the example embodiment of the present inventive concepts illustrated in FIG. 8. The horizontal cross section of the die through line XY is shown in 801. The Z height variation of various regions A, B, and C corresponding to the horizontal cross section in the XY plane is indicated in 802. The Z height variation in the vertical cross section is shown in the images 803 and 804.

FIG. 9A depicts a die image captured using the image capturing system, where the speed of the SLM is matched to the camera sensor, according to at least one example embodiment of the present inventive concepts. In an example embodiment of the present inventive concepts, the speed of capturing of the camera sensor is equal to the rate of change of control signal at each segment of the SLM. In other words, the CCD sensor is configured to be speed matched with the SLM, however the example embodiments are not limited thereto. In FIG. 9, 9AA shows the entire die image, whereas 9AB shows an enlarged area of the die image around the defects. It is clear from the figure that because of the ability of the SLM to focus at multiple depths, both the B and C regions as mentioned in FIG. 9A appear sharp. This enables an "all-in-focus" high resolution scanning of the wafer, FIG. 9B depicts a die image captured using the image capturing system, where the speed of the SLM is 1/10th of the camera sensor, according to another example embodiment of the present inventive concepts. In this example embodiment of the present inventive concepts, an SLM is adapted to run with a speed that is not matched to the speed of the camera sensor, for example the SLM is run at a speed that is 1/10th of the speed of the CCD. The image 9BA shows the entire image while the image 9BB shows an enlarged area around the defects. Due to the ability of the SLM to focus the regions at multiple depths, both of the and C regions appear sharp. As a result, a majority of the defects are clearly visible.

Figure 10:
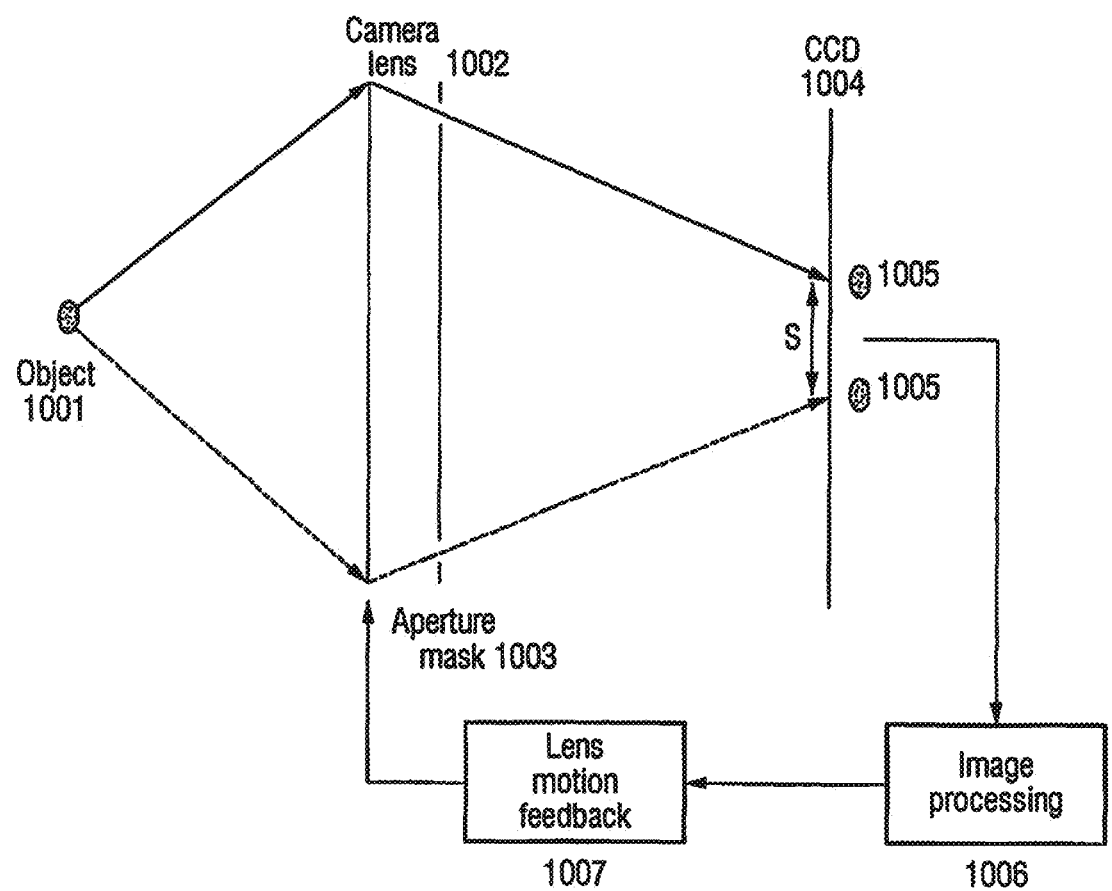
FIG. 10 illustrates an image capturing system with phase detection for auto focusing, according to prior art.

FIG. 10 illustrates an image capturing system with phase detection (PD) for auto focusing, according to prior art. The image capturing system with phase detection mechanism of auto focusing is prevalent in most high end smart phones. In such systems, the rays from the top (solid) and bottom (dashed) of the camera lens 1002 are separated, typically by an aperture mask 1003, or beam splitter, and captured at the CCD 1004 as two partial images 1005. The captured partial images are analyzed for overlap. The overlap is a function of the distance between the two partial images 1005. A feedback signal is sent to the camera lens motion mechanism to increase and/or maximize the overlap. The camera lens motion mechanism comprises an image processing module 1006 and the lens motion feedback module 1007. The image processing module 1006 processes partial images 1005 to identify the overlap between the partial images. The lens motion feedback module 1007 identifies the physical motion required for the camera lens to generate a high resolution image. The method as explained according to the prior art involves motion of the camera lens 1002 to obtain best focus of the object 1001. This leads to latency and delay.

Figure 11A:
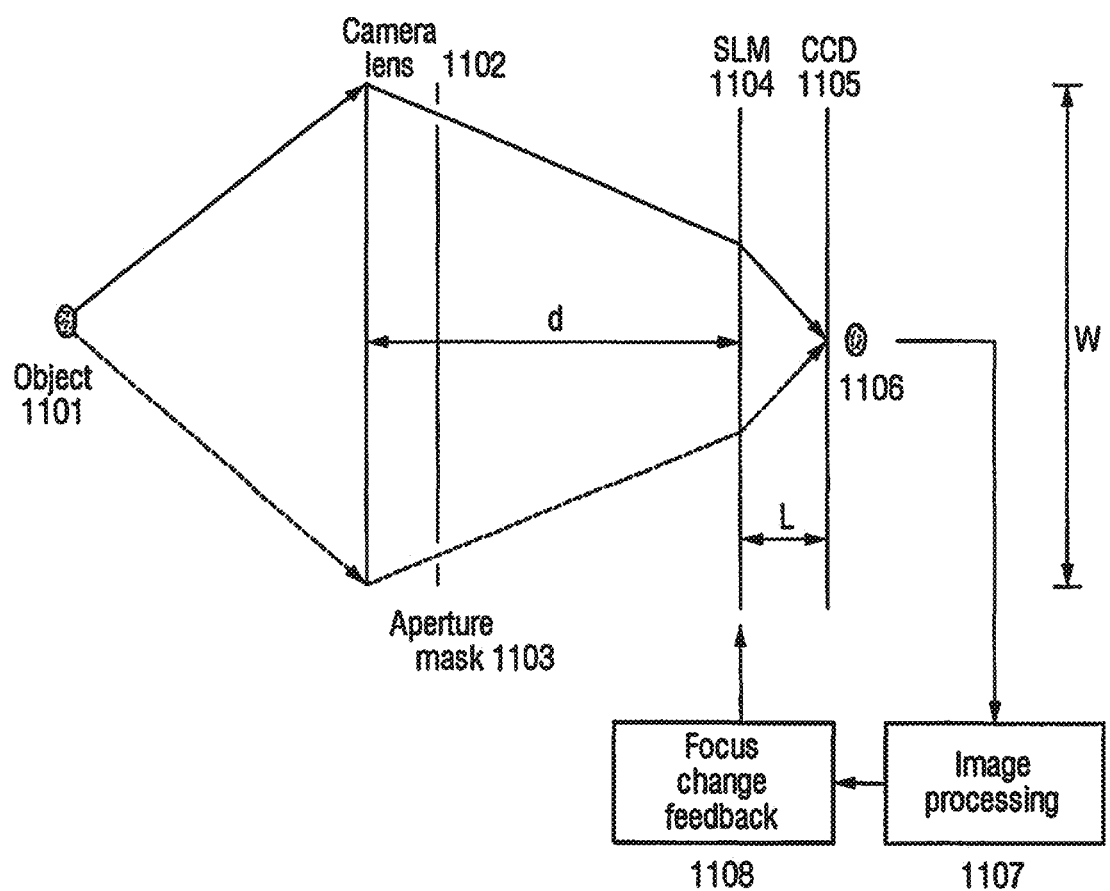
FIG. 11A illustrates an image capturing system for auto focusing according to at least one example embodiment of the present inventive concepts.

FIG. 11A illustrates an image capturing system for auto focusing according to at least one example embodiment of the present inventive concepts. In FIG. 11A, the image capturing system with the PD assembly for auto focusing comprises a camera lens 1102 for focusing an object 1101, aperture mask 1103, an SLM 1104, a camera sensor 1105, an image processing module 1107 coupled with the camera sensor 1105 and a focus change feedback system 1108. The PD assembly gives feedback to the SLM for changing the focus required to obtain an increased and/or maximum overlap. Accordingly, a control signal is applied to the SLM to change the focal length of the SLM, to convert the SLM as a lens of the required focal length. Since the relative positions of the lens, SLM and CCD do not change, only two values of the SLM focal length are possible for a given s: (Equation 7)

$$f_{SLM} = L^* \left[ \frac{d^*s \pm W^*L}{s^*(L+d)} \right]$$

where $f_{SLM}$ is the SLM focal length, W is the width of the lens. L is the distance between the SLM and CCD, d is the distance between the lens and SLM and s is the separation between two partial images prior to the increase, enhancement, and/or optimization of the focus. The partial images are generated when no phase-change is applied to the SLM elements. The focal length of the SLM is modified based on the overlap value between the partial images. These two values can be stored as a look up table for further increase of the auto focus speed. This focal length and s bear a fixed relation that can be converted to a look up table. The image processing module 1107 processes the partial images and identifies the modification required. The focus change feedback module 1108 applies the control signal to the SLM corresponding to required focal length change. No mechanical motion is required to auto focus the objects in the region of interest according to at least one example embodiment of the present inventive concepts.

Further, knowledge of the focal length of the compound lens system, $f_{lens}$, results in an object distance as follows: (Equation 8)

$$u = \frac{f_{lens}^* W^*(d+L)}{(d+L)^* W - f_{lens}^*(W \pm s)}$$

where the sign convention is opposite to that of equation 7. If the positive sign is used to calculate f SLM, then the negative sign is to be used in equation 8 and vice versa. Due to the high speed of the SLM, a focus and object distance matrix is built across the field of view which directly aids in the creation of a three dimensional (3D) model of the scene. Although the above description is for PD configuration and auto focusing, the solution can be easily extended to other active and passive methods of auto focus. For instance, in the case of using the contrast detection method, the focal length of the SLM is scanned over a desired (or alternatively, pre-determined) distance to find the value that increases and/or maximizes the contrast. For active methods that directly give the object distance, such as using infrared (IR) sensors, ultrasound sensors, etc., equation 6 is used to determine the SLM focal length. In at least one example embodiment of the present inventive concepts, the focal length of the SLM may be modified within a limited or desired range of time Due to the high speed of the SLM, the limiting factor for auto focus in image capturing system according to present inventive concepts is the image processing rather than the focal length adjustment. This opens up new areas of applications in the field of high speed object tracking. In at least one example embodiment of the present inventive concepts, the modification of the focal length of the SLM is fast In ordinary conventional cameras, the speed of capture of normal CCD sensors is much slower (~60 Hz) than line scan CCD sensors. In other words, conventional cameras have much slower refresh rates when compared to the refresh rates of the SLM (e.g., for commercial SLMs, the refresh rate is approximately ~200 Hz, while research grade SLMs have refresh rates of approximately ~1.4 kHz). In the present example embodiment, the SLM functions as a single lens without segmentation, but is not limited thereto.

Figure 11B:
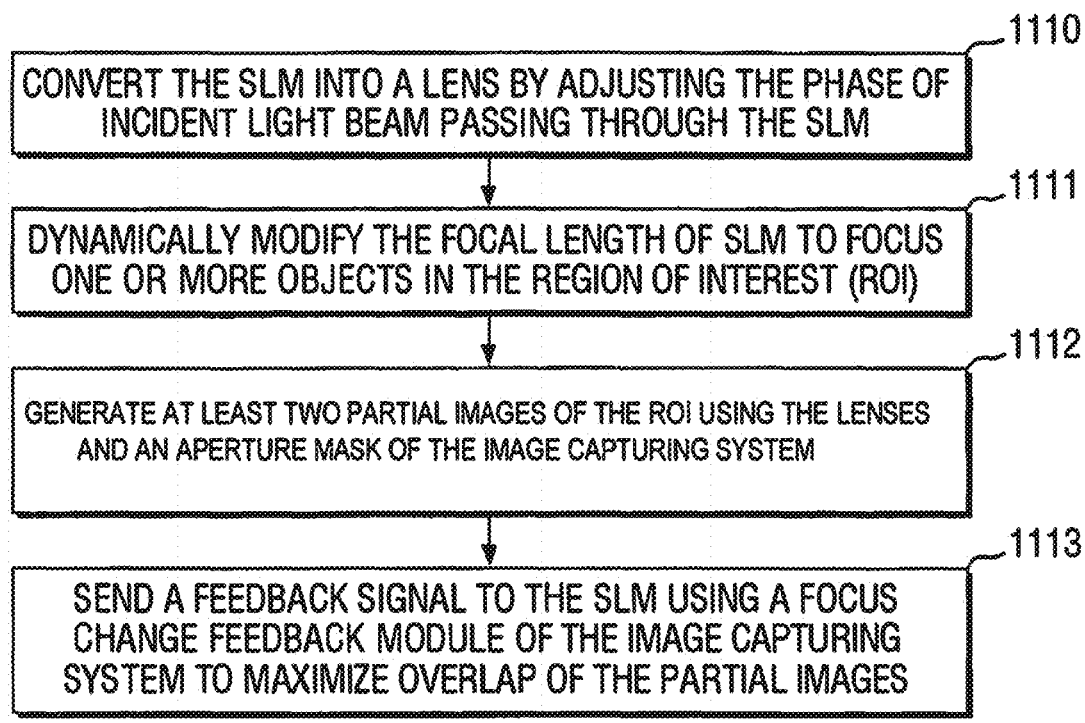
FIG. 11B illustrates a method of enabling auto focusing of one or more objects in the region of interest using the spatial light modulators (SLM) for motionless auto focus by a phase detection assembly, according to at least one example embodiment of the present inventive concepts.

FIG. 11B illustrates a method of enabling auto focusing of one or more objects in a region of interest (ROI) using the spatial light modulators (SLM) for motionless auto focus by a phase detection assembly, according to at least one example embodiment of the present inventive concepts. At step 1110, the SLM is converted into a lens by adjusting the phase of the light beam passing through the SLM. Then the focal length of the lens is modified dynamically based on the distance from one or more objects in the ROI as indicated in step 1111. Further, at least two partial images of the ROI are generated using the lenses and an aperture mask of the image capturing system as shown in step 1112. At step 1113, a feedback signal is sent to the SLM using a focus change feedback module of the image capturing system to increase and/or maximize the overlap of the partial images of region of interest generated using the lenses and an aperture mask for enabling auto focusing. The feedback signal is generated based on the known distance of the one or more objects from the lens.

Figure 12:
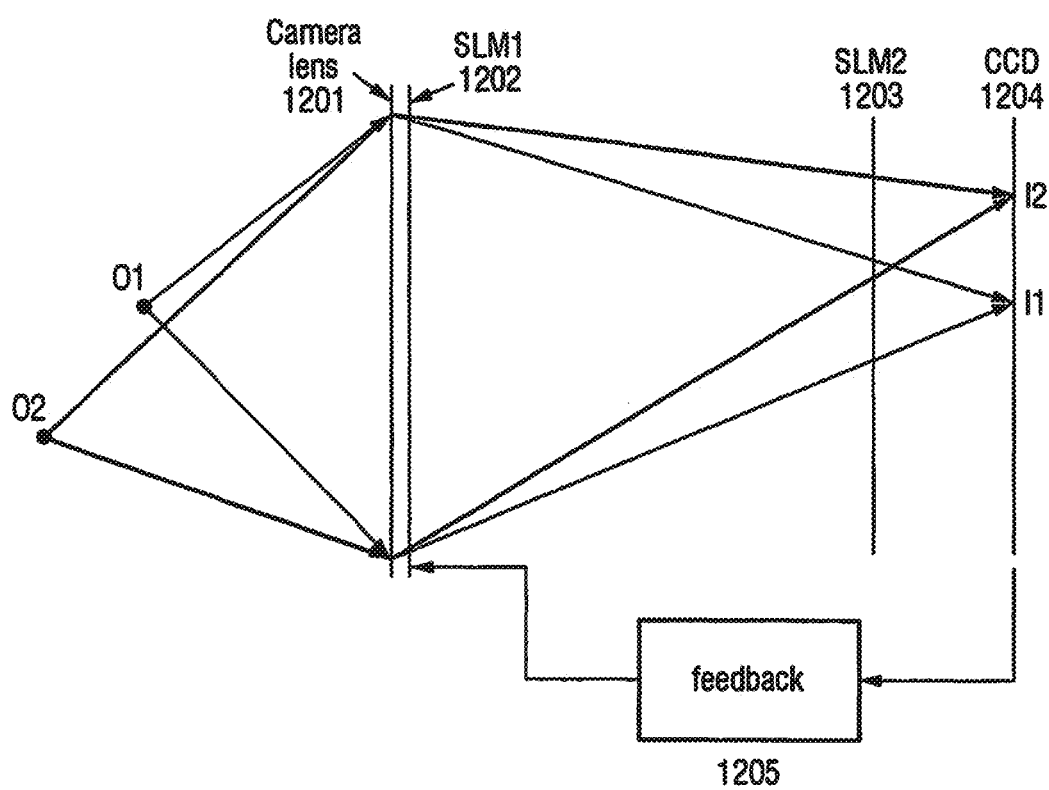
FIG. 12 illustrates an image capturing system for aberration correction, according to at least one example embodiment of the present inventive concepts.

FIG. 12 illustrates an image capturing system for aberration correction, according to at least one example embodiment of the present inventive concepts. In FIG. 12, at least two SLMs are implemented in the image capturing system in order to enable aberration correction. The first SLM 1202 is placed close to the camera lens 1201 and second SLM 1203 is located near the CCD sensor 1204. The second SLM 1203 near the CCD sensor 1204 is used for multi focus and auto focus mechanisms. The first SLM 1202 near the lens is coded with the appropriate Zernike polynomials to correct aberrations. The focus of the second SLM 1203 is adjusted to get the best image for object (O1) on the CCD sensor 1204 while maintaining the first SLM 1202 at a zero phase-change. Further, the phase of the first SLM 1202 is adjusted with feedback received from the CCD sensor 1204 to further improve the image. The feedback is sent to the first SLM 1202 using the feedback module 1205. Such adjustment corresponds to the encoding of the first SLM 1202 with the Zernike polynomials with increasing orders. This procedure is repeated for object 2 (O2), and so forth, to obtain a list of Zernike coefficients for a 3D matrix.

The blurriness in an image may be due to defocusing and/or aberrations. In order to generate a clear image, the second SLM 1203 near the CCD sensor 1204 is tuned to eliminate the defocus and/or aberration. Once an increased, enhanced, and/or optimum focus is obtained, the remaining distortion or defocus is due only to aberrations which may be corrected as described in connection with FIG. 12. In order to perform multi path aberration correction, multiple SLMs are used to tune aberration correction for specific object(s) in the field of view.

Figure 13:
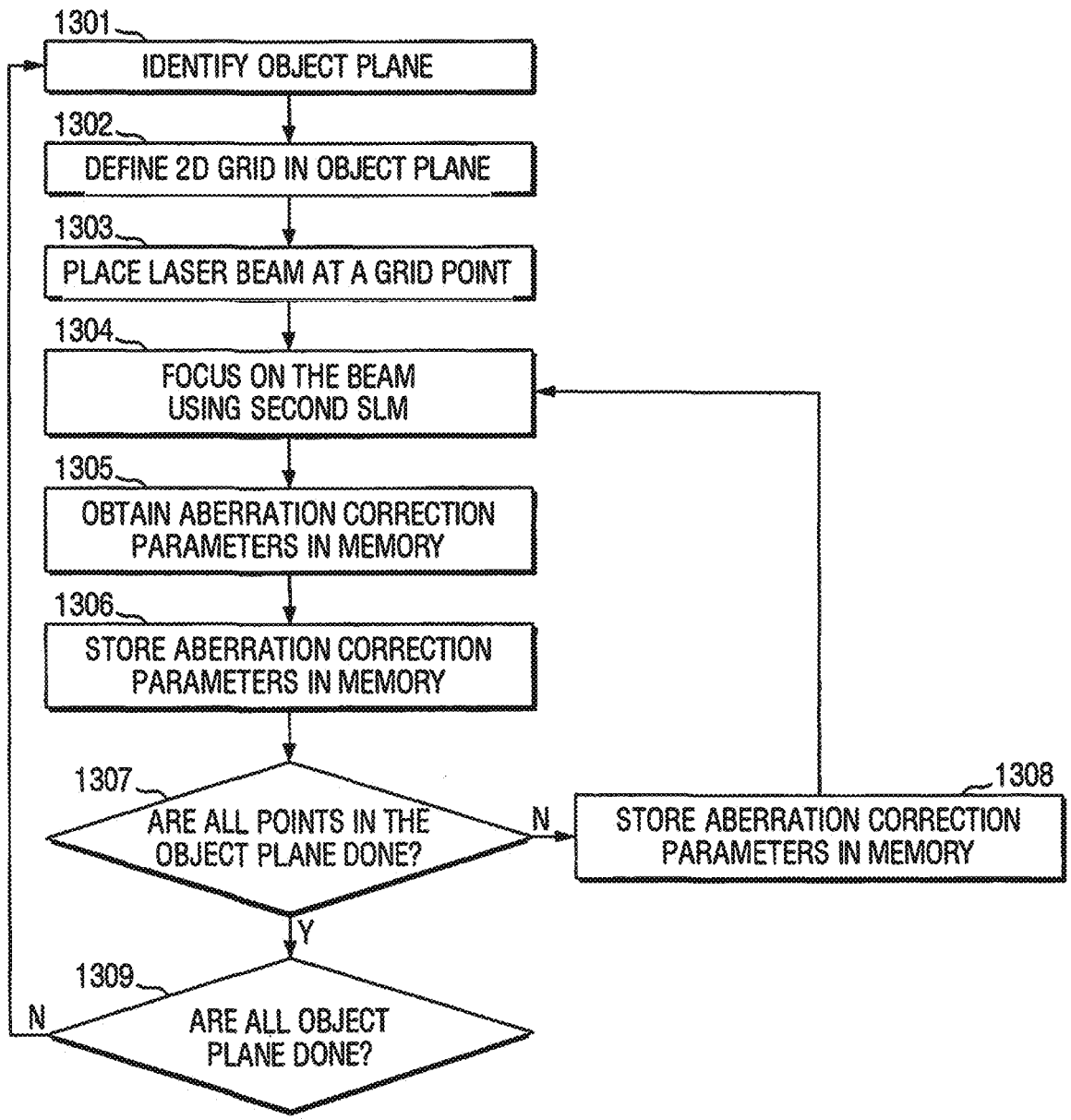
FIG. 13 is a flow diagram illustrating a method of enabling auto focusing of one or more objects in the region of interest using at least two spatial light modulators (SLM) for removing aberration, according to at least one example embodiment of the present inventive concepts.

FIG. 13 is a flow diagram illustrating a method of enabling auto focusing of one or more objects in the region of interest using at least two spatial light modulators (SLM) for removing aberration, according to at least one example embodiment of the present inventive concepts. At step 1301, at least one object in the region of interest is identified. A small spot sized object, such as a beam from a He—Ne laser or the like, is placed at different locations in the object plane based on a desired 2D grid pattern to define the 2D grid in the object plane as shown at step 1302. The laser beam is placed at the grid point at step 1303. Then, the beam is focused using the second SLM 1203 at step 1304. The aberration correction for the first SLM 1202 is obtained at step 1305. For each location, the second SLM 1203 is adjusted so that an improved, enhanced, and/or best focus is obtained. Further, the aberration correction is performed by sending feedback to the first SLM 1202 to obtain the list of Zernike coefficients. By repeating the steps for all locations in the grid, a 2D aberration correction matrix is obtained. Likewise, by repeating the procedure for different object planes, a 3D aberration correction matrix is obtained. Thus, each point in the 3D matrix has a list of corresponding Zernike coefficients. These coefficients are called aberration correction parameters. The aberration correction parameters may be stored in the memory of the image capturing device (e.g., camera) according to at least one example embodiment of the present inventive concepts at step 1306.

Further, at step 1307, it is determined whether the aberration correction is performed for all of the grid points corresponding to the object. If not, then at step 1308, the laser beam is shifted to a new grid point and steps 1304 to 1306 are repeated for the new grid point. Once the aberration corrections for all of the points are done, then it is determined whether the aberration correction for all the objects in the region of interest is done at step 1309. If not, then the steps from 1301 to 1309 are repeated until the last object point's aberration correction is obtained.

Figure 14:
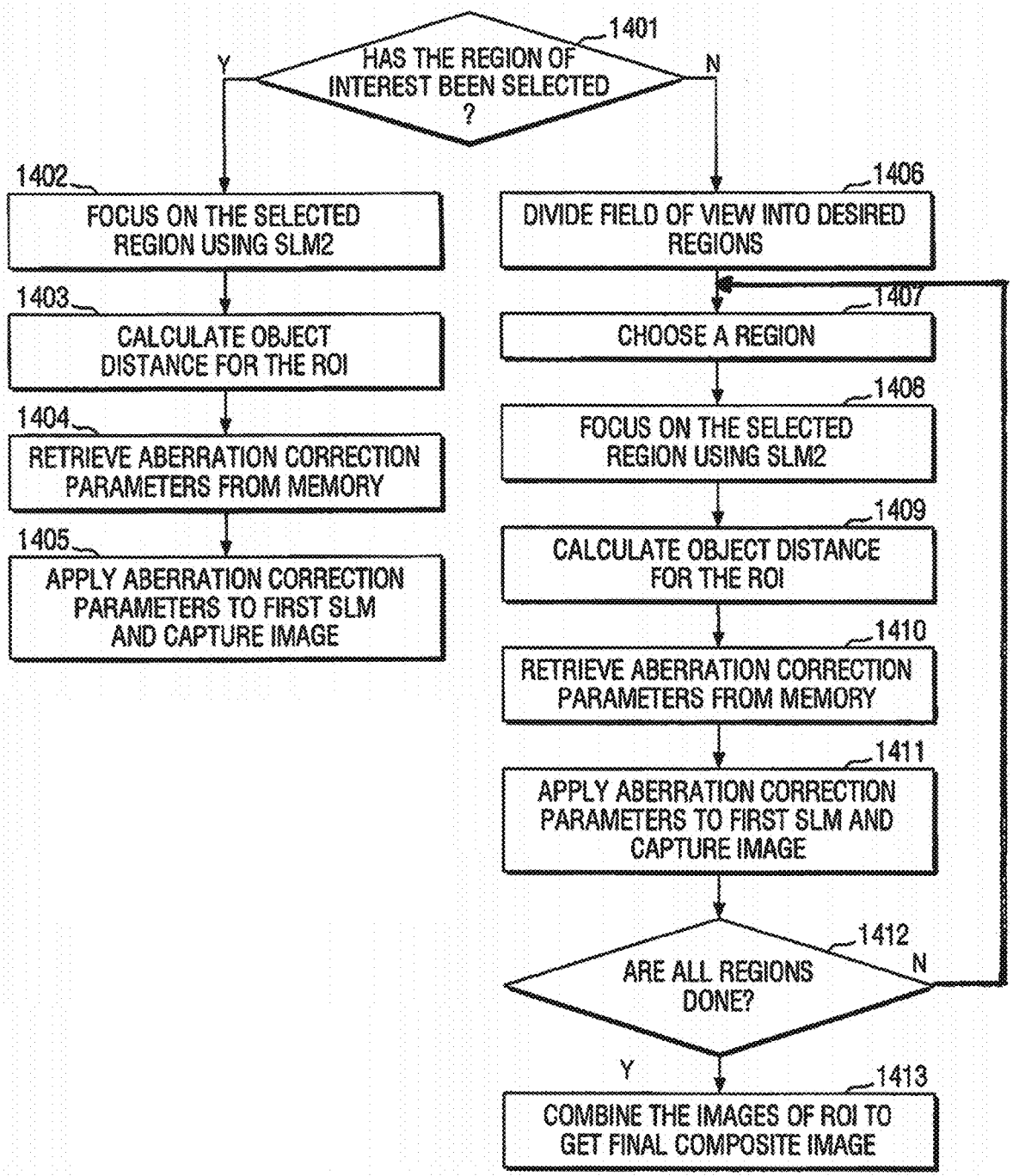
FIG. 14 is a flow diagram illustrating a method of capturing an aberration corrected image at real time, according to at least one example embodiment of the present inventive concepts.

FIG. 14 is a flow diagram illustrating a method of capturing an aberration corrected image in real time, according to at least one example embodiment of the present inventive concepts. In order to perform the aberration correction in real time based on using aberration matrices stored in the image capturing device, a desired region of interest to be corrected is selected. At step 1401, it is determined whether a region of interest has been selected, for example by a user, by an automatic/computerized process, by random, etc. If the region of interest has been selected, then the second SUM 1203 of the image capturing system is focused on the selected region at step 1402. The distance from each of the object(s) in the region of interest is calculated from the image capturing system at step 1403. At step 1404, the aberration correction parameters are retrieved from memory. The retrieved aberration correction parameters are applied on the first SLM 1202 of the image capturing system at step 1405.

Whereas, if the region of interest has not selected, then the field of view of the image capturing device is divided in to desired (or alternatively, pre-determined) regions at step 1406. Subsequently, each of the regions is selected for aberration correction as indicated at step 1407. Then, at step 1408, the second SLM 1203 of the image capturing system is focused on the selected region. The distance from each of the object(s) in the region of interest is calculated from the image capturing system at step 1409. At step 1410, the aberration correction parameters are retrieved from memory. The retrieved aberration correction parameters are applied on the first SLM 1202 of the image capturing system at step 1411. Further, at step 1412, it is determined whether the aberration correction is completed at each region. If not, then the steps from 1407 to 1411 are repeated for each of the regions. Finally, the images corresponding to each of the region(s) is used to generate a final composite image at step 1413.

Figure 15:
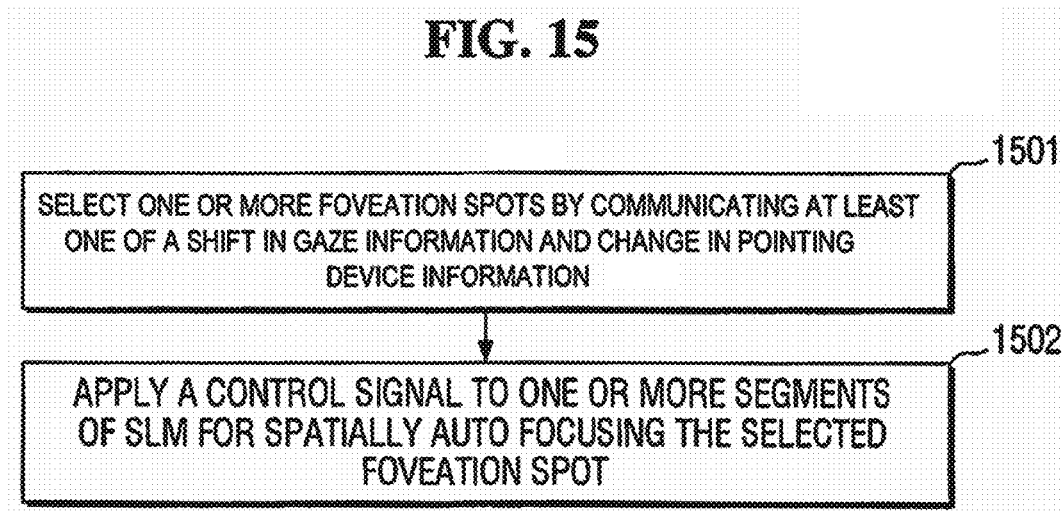
FIG. 15 is a flow diagram illustrating a method of enabling auto focusing of one or more objects in the region of interest using one or more spatial light modulators (SLM), for spatially auto focusing foveation spot, according to at least one example embodiment of the present inventive concepts.

FIG. 15 is a flow diagram illustrating a method of enabling auto focusing of one or more objects in the region of interest using one or more spatial light modulators (SLMs), for spatially auto focusing foveation spot, according to one example embodiment of the present inventive concepts. At step 1501, one or more foveation spots are selected by communicating at least one of a shift in gaze information and change in pointing device information, etc., to the image capturing system upon identifying the object in focus. The gaze information corresponds to the information of where on the screen the user is looking (such as obtained from a device that detects the gaze of the user or a user interface tool, such as a pointer in the hand of the user which he uses to point on the video screen, mouse, touch gesture, etc., is obtained and delivered to the camera and/or video camera that contains the SLM. This forms the region of interest in the image frame and/or video frame. Based on this information, the SLM phase profile is altered to bring the objects in the region of interest in focus by forming segmented lenses in the SLM. At step 1502, a control signal is applied to one or more segments of the SLM for spatially auto focusing the selected foveation spot.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of enabling spatially varying auto focusing of one or more objects using an image capturing system comprising:
    focusing, using one or more lenses of the image capturing system, on one or more objects in a region of interest;
    enabling spatially varying auto focusing of the one or more objects in the region of interest using at least two spatial light modulators (SLM), wherein at least one of the one or more objects are out of focus when viewing the region of interest; and
    capturing the focused and the auto focused objects in the region of interest using a camera sensor, wherein
    the enabling spatially varying auto focusing of one or more objects in the region of interest includes removing an aberration from the captured image using the at least two SLMs,
    the removing including,
        positioning a first SLM of the at least two SLMs and a second SLM of the at least two SLMs between the lens and the camera sensor,
        changing a focal length of the second SLM by providing a control signal to the second SLM to enable auto focus, and
        modifying a phase profile of the first SLM based on feedback received from the camera sensor to further improve the image corresponding to encoding of an image with Zernike polynomials with increasing orders; and
        storing the modified phase profile of the first SLM in a memory of the image capturing device;
    the removing further including,
        determining whether the region of interest has been selected,
        dividing a field of view of the image capturing system into one or more desired regions of interest, if the region of interest has not been selected,
        applying an aberration correction to the first SLM that corresponds to the regions of interest,
        capturing an image of each of the regions of interest, and
        forming a composite image by combining the captured images of each of the regions of interest.

2. The method as claimed in claim 1, wherein at least one SLM of the at least two SLMs includes one or more segments.

3. The method as claimed in claim 2, further comprising:
    applying a control signal to the at least one SLM of the at least two SLMs and each segment of the at least one SLM; and
    modifying refractive indexes of each of the segments of the at least one SLM and phase of light beam incident on each of the segments of the at least one SLM in accordance with the applied control signal.

4. The method as claimed in claim 1, further comprising:
    modifying a control signal to provide quadratic variation in phase change across the at least two SLMs, wherein the phase change corresponds to a change in focal length of the at least two SLMs.

5. The method as claimed in claim 1, wherein the enabling spatially varying auto focusing of the one or more objects in the region of interest using the at least two SLMs includes:
    obtaining a Z map of a die of a wafer to be inspected; and
    calibrating focal lengths of the at least two SLMs in accordance with a corresponding control signal based on the Z map of the die for enabling auto focusing of the die of a wafer to be inspected on the camera sensor; and
    dynamically varying in real time the control signal so as to correspond each segment of the at least two SLMs with the die below the camera sensor, by providing different focal lengths using values from the calibration and the Z map.

6. The method as claimed in claim 5, wherein the obtaining the Z map of the die of the wafer to be inspected includes:
    analyzing a cross section of the die to be inspected to obtain a Z height of the die; and
    quantizing the Z height of the die based on a desired acceptance circle of confusion.

7. The method as claimed in claim 5, wherein the calibrating focal lengths of the at least two SLMs includes:
    locating the die having a Z height at a desired distance in front of a camera system for calibrating the focal lengths of the at least two SLMs;
    modifying the control signal corresponding to each segment of the at least two SLMs to bring about a corresponding phase change in each of the segments of the at least two SLMs to capture an image with a desired clarity on the camera sensor; and
    storing the modified control signal and the corresponding phase change of each of the segments of the at least two SLMs corresponding to the Z map of the die in a memory of the image capturing system.

8. The method as claimed in claim 1, wherein the enabling spatially varying auto focusing of the one or more objects in the region of interest using the at least two SLMs includes:
    enabling auto focusing for one or more foveation spots;
    selecting the one or more foveation spots by communicating at least one of a shift in gaze information and change in pointing device information to the image capturing system upon identifying the object in focus; and
    applying the control signal to the one or more segments of the at least two SLMs for auto focusing the selected foveation spot.

9. An image capturing method, comprising:

modulating, using a plurality of spatial light modulators (SLMs), light reflected from at least one object located on a semiconductor wafer in accordance with a real-time modulation command, each of the SLMs including a plurality of individually addressable segments;

capturing, using an image sensor, an image output by the SLMs; and transmitting, using at least one processor, the real-time modulation command to the plurality of SLMs based on the captured image, wherein the modulating includes enabling spatially varying auto focusing of one or more objects in a region of interest, the enabling includes removing an aberration from the captured image using at least two SLMs of the plurality of SLMs, the removing including,
- positioning a first SLM of the at least two SLMs and a second SLM of the at least two SLMs between the lens and the image sensor,
- changing a focal length of the second SLM by providing a control signal to the second SLM to enable auto focus, and
- modifying a phase profile of the first SLM based on feedback received from the image sensor to further improve the image corresponding to encoding of an image with Zernike polynomials with increasing orders; and storing the modified phase profile of the first SLM in a memory of the image capturing device;

the removing further including,
- determining whether the region of interest has been selected,
- dividing a field of view into one or more desired regions of interest, if the region of interest has not been selected,
- applying an aberration correction to the first SLM that corresponds to the regions of interest,
- capturing an image of each of the regions of interest, and
- forming a composite image by combining the captured images of each of the regions of interest.

10. The image capturing method as claimed in claim 9, further comprising:

filtering, using an aperture mask, the reflected light prior to receipt by the SLMs;

generating, using the image sensor, one or more partial images from the filtered light;

processing, using the at least one processor, the generated partial images; and providing, using the at least one processor, feedback to the SLMs to modify focal lengths of the SLMs in accordance with the generated partial images.

11. The image capturing method as claimed in claim 9, wherein the real-time modulation command includes instructions to configure the SLMs to adjust the phase of the reflected light passing through the SLMs.

12. The image capturing method as claimed in claim 9, wherein the object is a calibration die including a plurality of physical features of different heights.

13. The image capturing method as claimed in claim 12, wherein the transmitting includes:

storing information regarding the different heights of the physical features in a memory associated with the image sensor;

clustering the different heights in accordance with a calculated depth of field; and generating, using the at least one processor, the real-time modulation command based on the clustered heights.

14. The image capturing method as claimed in claim 11, further comprising:

modifying, using the at least one processor, the real-time modulation command based on the height of each segment of the object being viewed by the image sensor.

* * * * *